(12) United States Patent
Yamaguchi et al.

(10) Patent No.: US 9,809,094 B2
(45) Date of Patent: Nov. 7, 2017

(54) VEHICLE

(71) Applicant: HONDA MOTOR CO., LTD., Tokyo (JP)

(72) Inventors: Tomoki Yamaguchi, Wako (JP); Hitoshi Hakamada, Waki (JP); Seiji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/900,464

(22) PCT Filed: Apr. 22, 2014

(86) PCT No.: PCT/JP2014/061222
§ 371 (c)(1),
(2) Date: Dec. 21, 2015

(87) PCT Pub. No.: WO2014/175238
PCT Pub. Date: Oct. 30, 2014

(65) Prior Publication Data
US 2016/0152120 A1 Jun. 2, 2016

(30) Foreign Application Priority Data
Apr. 23, 2013 (JP) .................................. 2013-090727

(51) Int. Cl.
*B60J 5/10* (2006.01)
*B60K 13/04* (2006.01)

(52) U.S. Cl.
CPC ............... *B60J 5/107* (2013.01); *B60J 5/101* (2013.01); *B60J 5/105* (2013.01); *B60K 13/04* (2013.01)

(58) Field of Classification Search
CPC . B60J 5/107; B60J 5/101; B60J 5/105; B60K 13/04
See application file for complete search history.

(56) References Cited

U.S. PATENT DOCUMENTS 5,083,833 A  1/1992 Herrmeyer

FOREIGN PATENT DOCUMENTS

DE   10 2008 020 090 A1   10/2009
DE       102008018333 A1 * 10/2009 ............. B60J 5/105
(Continued)

OTHER PUBLICATIONS

Intrernational Search Report dated Jul. 22, 2014, issued in counterpart Application No. PCT/JP2014/061222 (2 pages).
(Continued)

*Primary Examiner* — Lori L Lyjak
(74) *Attorney, Agent, or Firm* — Westerman, Hattori, Daniels & Adrian, LLP

(57) ABSTRACT

This vehicle has a travel drive system including a travel power source and an energy source for this travel power source, wherein an outlet for discharging waste generated by the travel drive system faces the rear surface of the vehicle body. The outlet is offset in the vehicle width direction relative to a passenger opening. Further, relative to the center line between the center line of the vehicle body in the vehicle width direction and the end portion of the vehicle body in the vehicle width direction, the outlet is positioned to the end portion side of the vehicle body in the vehicle width direction. Relative to the center line between the center line and the end portion in the vehicle width direction, the right and left edges of the passenger opening are positioned to the side of the center line of the vehicle body in the vehicle width direction.

7 Claims, 19 Drawing Sheets

(56) References Cited

FOREIGN PATENT DOCUMENTS

| DE | 102009030572 A1 | * | 12/2010 | .............. B60J 5/105 |
| FR | 2987788 A1 | * | 9/2013 | .............. B60J 5/105 |
| JP | 5-4519 A | | 1/1993 | |
| JP | 2514650 U | | 8/1996 | |
| JP | 2004-299641 A | | 10/2004 | |
| JP | 2008-128102 A | | 6/2008 | |

OTHER PUBLICATIONS

Written Opiniont dated Jul. 22, 2014, issued in counterpart Application No. PCT/JP2014/061222 (5 pages).

* cited by examiner

FIG.4
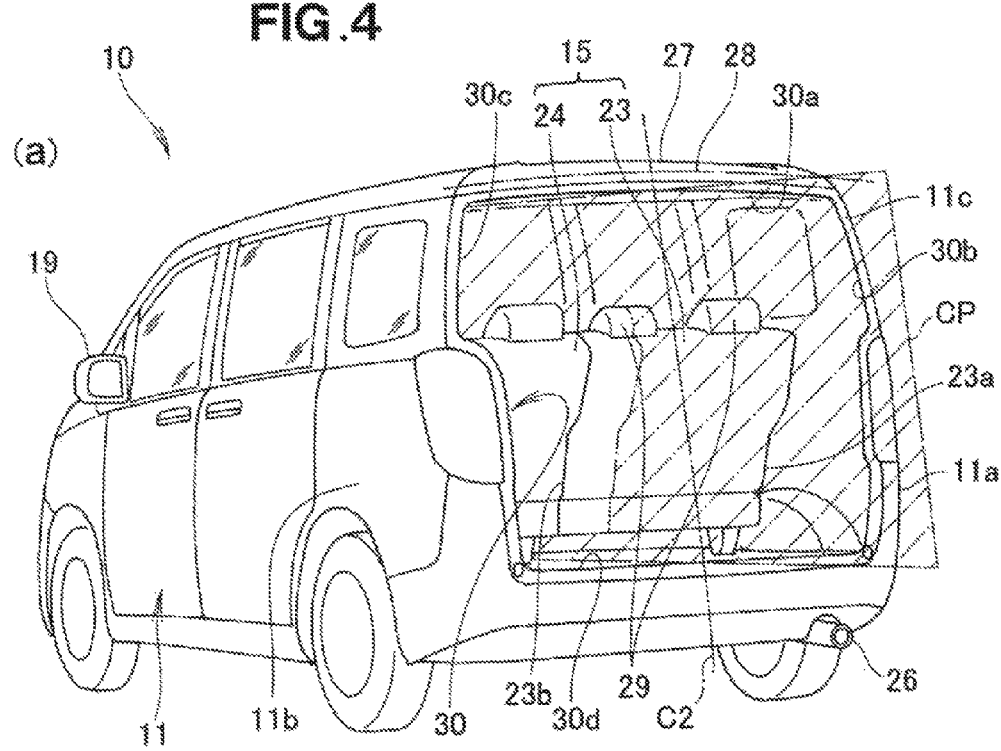
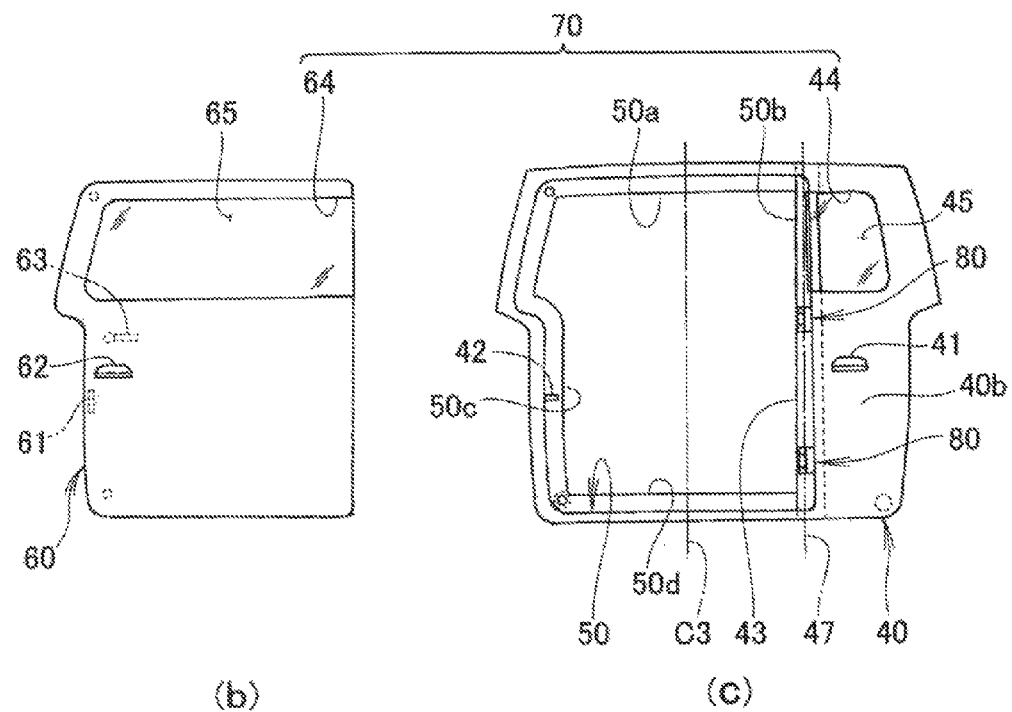

FIG.9
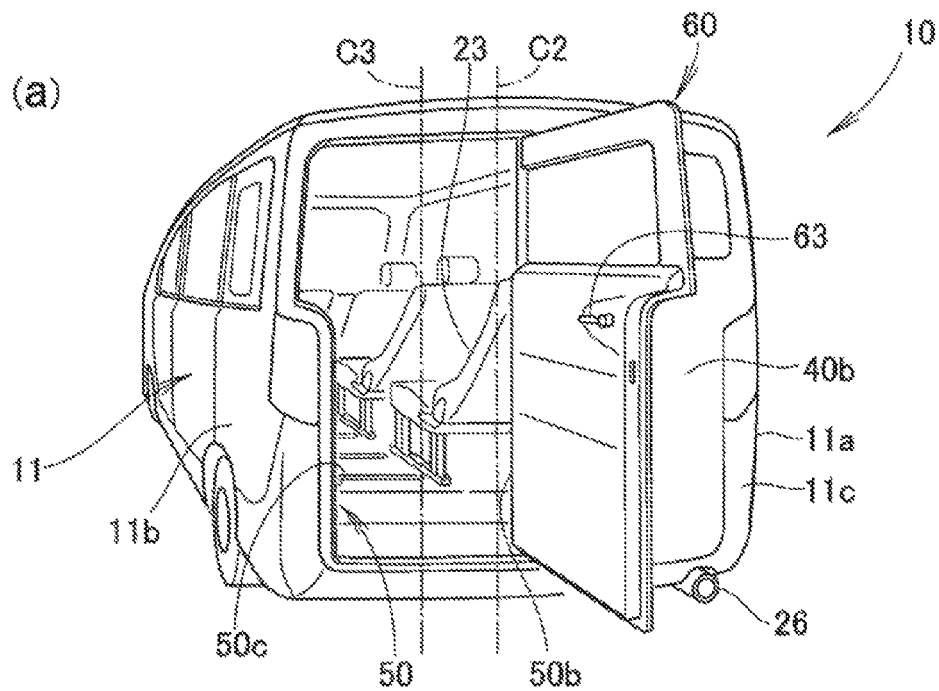
(a)
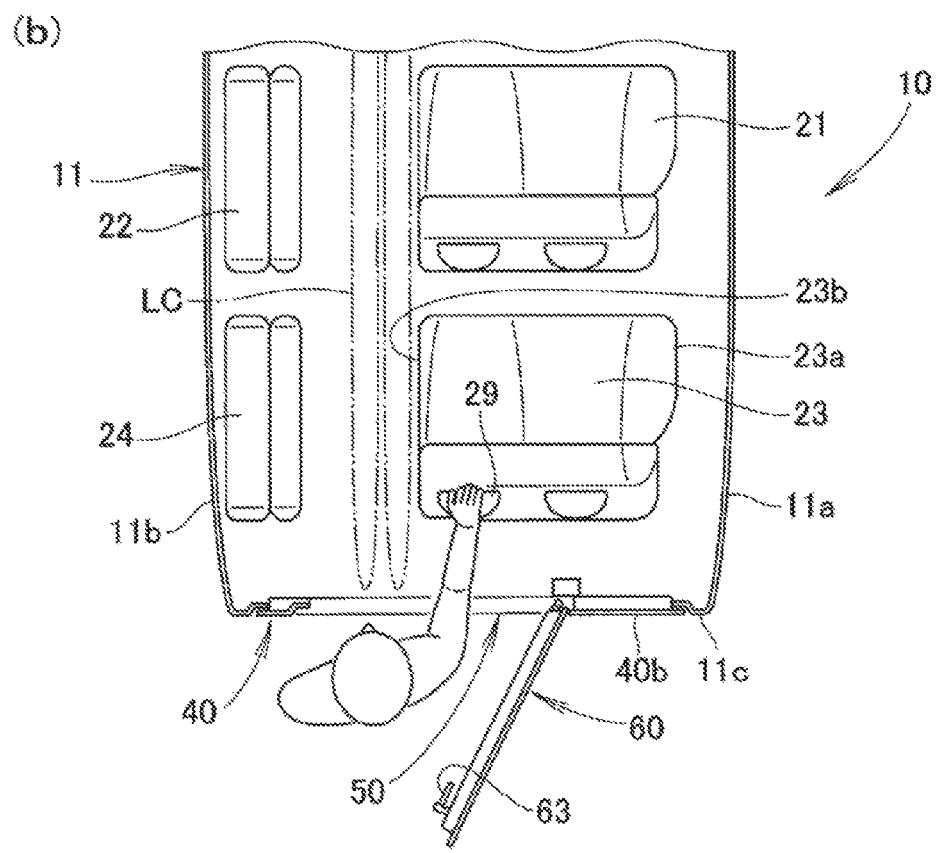
(b)

FIG.10
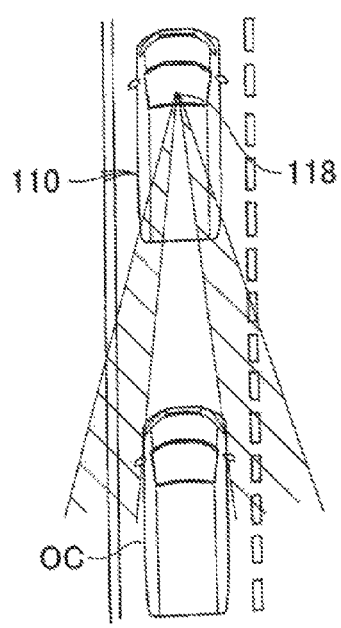
(a) COMPARATIVE EXAMPLE
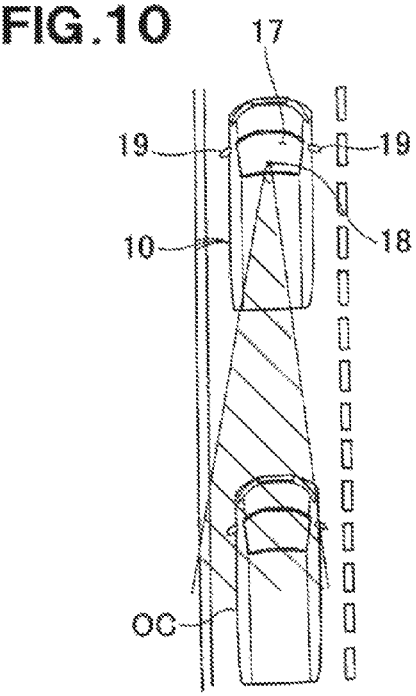
(b) INVENTIVE EMBODIMENT
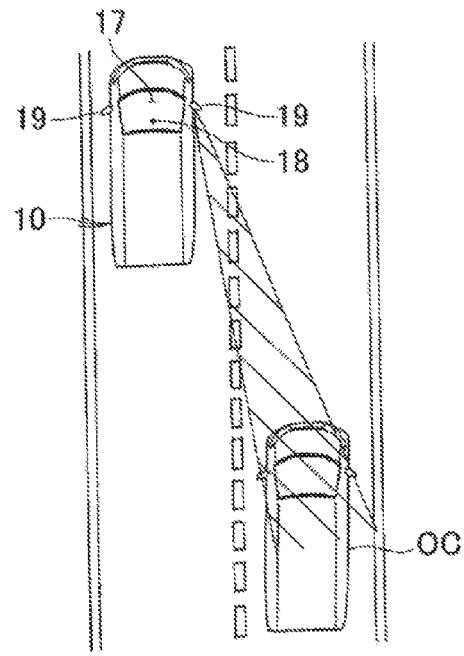
(c) INVENTIVE EMBODIMENT
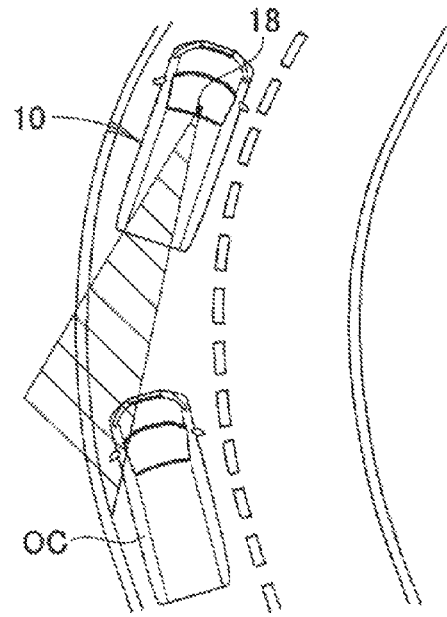
(d) INVENTIVE EMBODIMENT

FIG.11
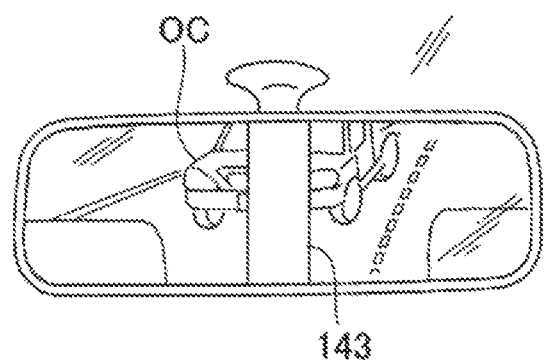
(a) COMPARATIVE EXAMPLE
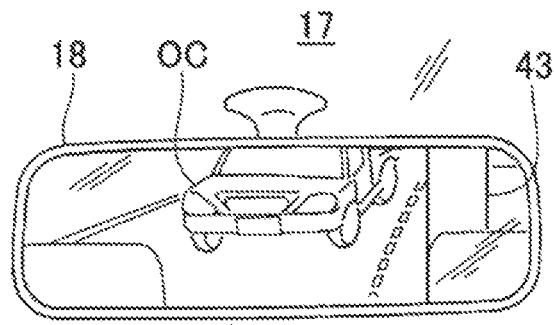
(b) INVENTIVE EMBODIMENT

FIG.13
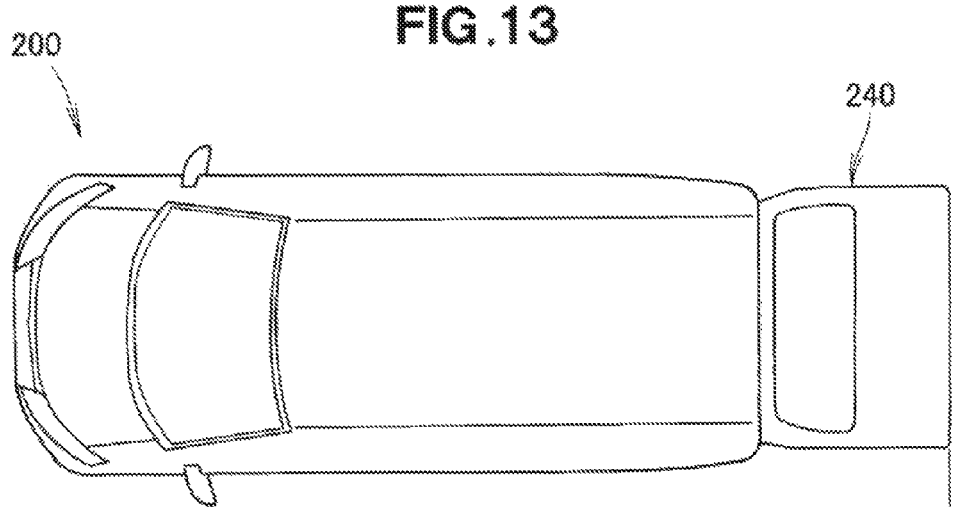
(a) COMPARATIVE EXAMPLE
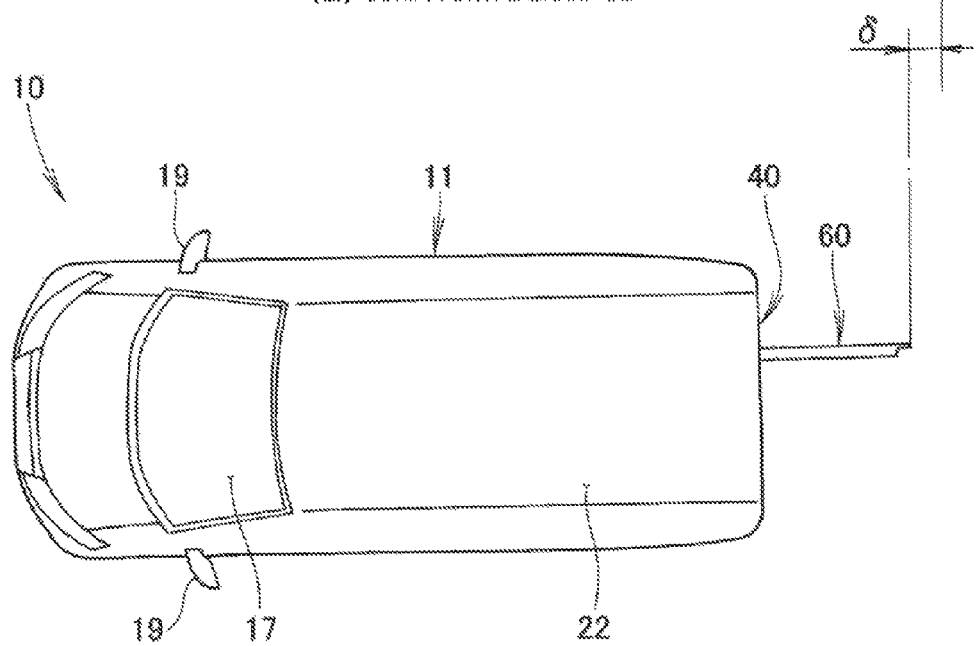
(b) INVENTIVE EMBODIMENT FIG.14
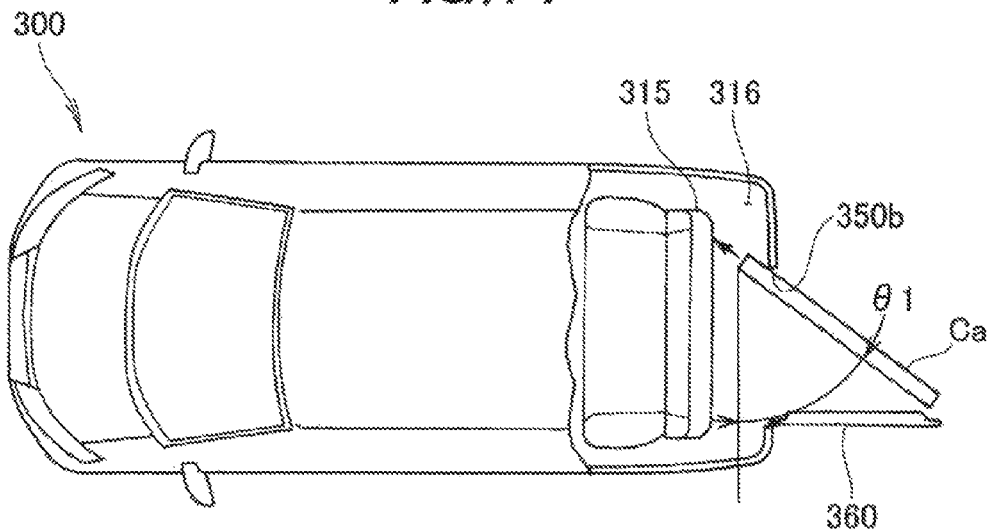
(a) COMPARATIVE EXAMPLE
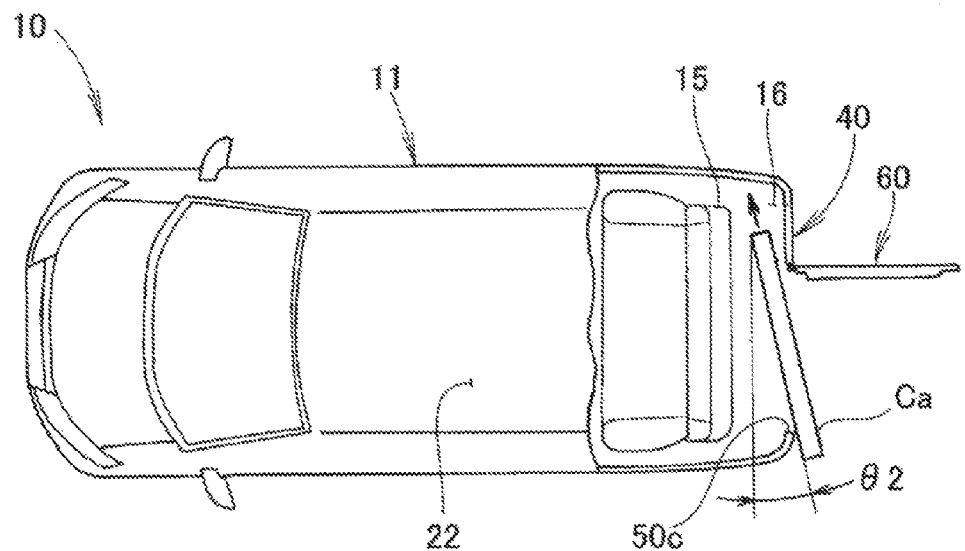
(b) INVENTIVE EMBODIMENT FIG.15
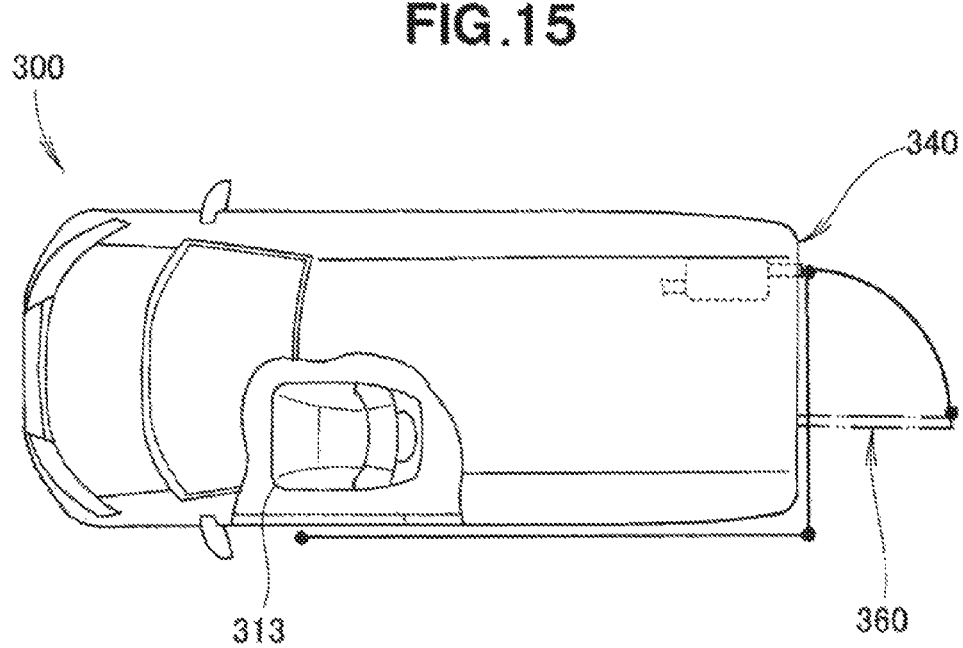
(a) COMPARATIVE EXAMPLE
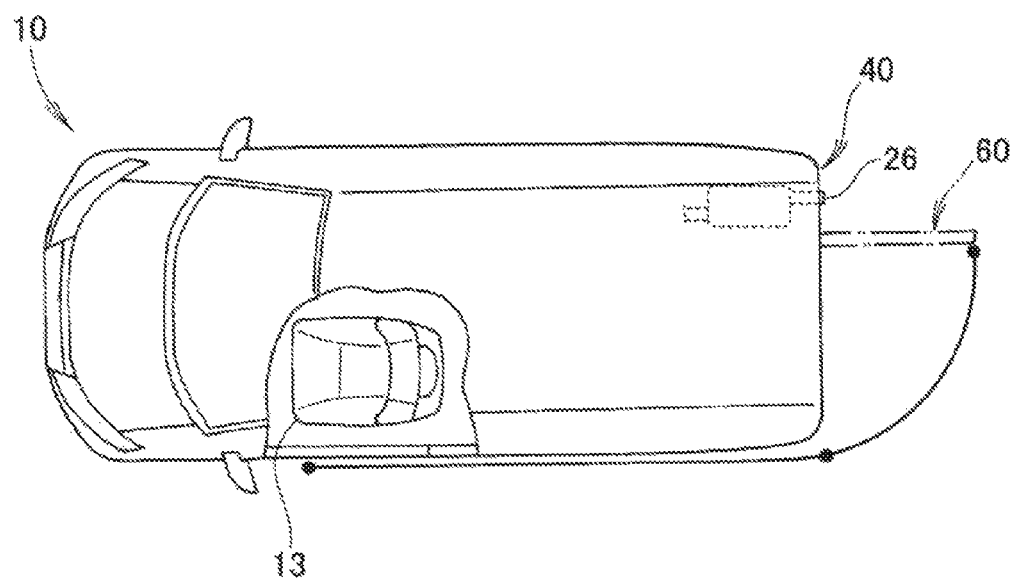
(b) INVENTIVE EMBODIMENT

VEHICLE

TECHNICAL FIELD

The present invention relates to vehicles having an entrance/exit opening (or getting-in/getting-out opening) formed in the rear surface of the vehicle.

BACKGROUND ART

Vehicles have been known which have a rear opening formed in the rear surface of the vehicle and a tailgate capable of opening and closing the rear opening. The tailgate is pivotably mounted on the vehicle body. An example of such vehicles is disclosed in Patent Literature 1.

The vehicle disclosed in Patent Literature 1 includes: the rear opening formed in the rear surface; the tailgate pivotable in a vertical or up-down direction to open and close the rear opening; and an auxiliary opening formed in the tailgate; and two auxiliary doors for closing and opening the auxiliary opening.

The two auxiliary doors are supported by the tailgate via a link mechanism and are openable away from each other by pivoting outwardly from a widthwise center of the vehicle.

It is conceivable to apply such an auxiliary-door equipped tailgate to a vehicle of a large vehicle height. In such a case, a passenger can get in or out of the vehicle by opening the auxiliary doors, and it is preferable to allow a passenger to get in and out of the vehicle with an increased ease, i.e. provide the passenger with a high ease of getting in and out of the vehicle.

PRIOR ART LITERATURE

Patent Literature 1: Japanese Utility Model Registration No. 2514650.

SUMMARY OF INVENTION

Technical Problem

It is therefore an object to provide an improved vehicle which provides a high ease of getting in and out of the vehicle.

Solution to Problem

According to the present invention, there is provided an improved vehicle having an exhaust port exposed rearward from the rear surface of the vehicle for emitting discharge produced by a travel drive system of the vehicle, the rear surface having an entrance/exit opening formed therein to extend over a portion of the rear surface in a vehicle width direction, a remaining rear surface portion being formed in another portion of the rear surface than the entrance/exit opening, the exhaust port being offset from the entrance/exit opening in the vehicle width direction and located only at a position overlapping the remaining rear surface portion.

Preferably, in the vehicle of the present invention, left and right side edges of the entrance/exit opening are offset in the vehicle width direction from a widthwise centerline of the vehicle body.

Preferably, in the vehicle of the present invention, the exhaust port is located closer to a widthwise end of the vehicle body than a centerline between a widthwise centerline of the vehicle body and the widthwise end of the vehicle body, and left and right side edges of the entrance/exit opening are located closer to the widthwise centerline of the vehicle body than the centerline between the widthwise centerline of the vehicle body and the widthwise end of the vehicle body.

Preferably, the vehicle of the present invention includes a door capable of opening and closing the entrance/exit opening, and one of left and right side edges of the entrance/exit opening that is remote from the exhaust port is an opening start end that starts to be opened by the door.

Preferably, the vehicle of the present invention includes an outer handle for opening and closing the door, the outer handle being provided on the outer surface of the door near the side edge that is the opening start end.

Preferably, the vehicle of the present invention includes a door capable of opening and closing the entrance/exit opening, a door latch for maintaining the door in a closed position being provided on the door, a canceling operation means capable canceling latching by the door latch being provided on the inner surface of the door.

Preferably, the vehicle of the present invention has a rear opening formed in the rear surface to extend over a substantially entire range, in the vehicle width direction, of the rear surface, a tailgate openably and closably covering the rear opening being supported on the vehicle body the entrance/exit opening being formed in the tailgate.

Preferably, in the vehicle of the present invention, an opening operation means capable of opening the tailgate is provided only on the outer surface of the tailgate.

Advantageous Effects of Invention

In the present invention, the exhaust port is offset from the entrance/exit opening in the vehicle width direction. Thus, a passenger can get in or get out of the vehicle while appropriately avoiding the exhaust port, i.e. avoiding discharge, such as exhaust gas and water. Therefore, the vehicle of the present invention can be said to be a vehicle providing a high ease of getting in and out of the vehicle.

Further, in the present invention, the left and right side edges of the entrance/exit opening are offset in the vehicle width direction from the widthwise centerline of the vehicle body. Normally a driver's seat is provided at a position offset from the widthwise centerline of the vehicle body, and thus, a widthwise center region of the vehicle is a region which can be seen or visually checked by a human driver of the vehicle with ease. By forming the entrance/exit opening while avoiding such a region, the drive can get a high visibility.

Further, in the present invention, the left and right side edges of the entrance/exit opening and the exhaust port are disposed in such a manner as to sandwich therebetween the centerline between the widthwise centerline of the vehicle body and the widthwise end of the vehicle body. Thus, the entrance/exit opening and the exhaust port can be spaced from each other by a sufficient distance, so that the exhaust port can be located at a sufficient distance from a passenger getting in or out of the vehicle.

Furthermore, in the present invention, one of the left and right side edges of the entrance/exit opening that is remote from the exhaust port is an opening start end that starts to be opened by the door. Because the door is opened from the side edge remote from the exhaust port, a passenger can get in or out of the vehicle while more reliably avoiding discharge, such as exhaust gas and water, emitted from the exhaust port.

Furthermore, in the present invention, the outer handle for opening and closing the door is provided on the outer surface of the door near the side edge that is the opening start end. Because the outer handle is located adjacent to the opening start end, a passenger can get in or out of the vehicle without approaching the exhaust port in opening the door from outside the vehicle.

Furthermore, in the present invention, the canceling operation means capable canceling latching by the door latch is provided on the inner surface of the door. Thus, a passenger can get out of the vehicle through the rear opening by operating the door latch from inside the vehicle. At that time, the passenger can get out of the vehicle while avoiding the exhaust port, without taking the trouble of checking the position of the exhaust port.

Furthermore, in the present invention, the rear opening is formed in the rear surface to extend over a substantially entire range, in the vehicle width direction, of the rear surface, and the tailgate openably and closably covering the rear opening is supported on the vehicle body. When large-size baggage is to be loaded into the vehicle, the tailgate is pivoted upward. Because the rear opening opens over the entire rear surface of the vehicle body, the large-size baggage can be loaded into the vehicle with ease.

Furthermore, in the present invention, the opening operation means capable of opening the tailgate is provided only on the outer surface of the tailgate, so that a passenger can be prevented from mistakenly opening, from inside the vehicle, the tailgate mounted over a substantially entire range in the vehicle width direction. Because the tailgate is prevented from being opened from inside the vehicle, it is possible to prevent a passenger from getting out of the vehicle onto a position near the exhaust port.

BRIEF DESCRIPTION OF DRAWINGS

FIG. 4 is an exploded perspective view of the vehicle shown in FIG. 1:

FIG. 9 is a view explanatory in greater detail of the operation explained in relation to FIG. 8;

FIG. 10 is a view explanatory of operation of the vehicle shown in FIG. 1 during travel of the vehicle;

FIG. 11 is a view explanatory of operation of a room mirror during travel of the vehicle shown in FIG. 1;

FIG. 13 is a view explanatory of details of the door shown in FIG. 1;

FIG. 14 is a view explanatory of operation when elongated baggage is to be loaded into the vehicle with the door opened;

FIG. 15 is a view explanatory of operation when the door shown in FIG. 1 is to be opened;

DESCRIPTION OF EMBODIMENTS

In the following description, the terms "left" and "right" are used to refer to directions as viewed from an occupant or passenger of a vehicle, and the terms "front" and "rear" are used to refer to directions as viewed in a traveling direction of the vehicle. In the accompanying drawings, "Fr", "Rr", "R", "L", "Up" and "Dw" represent "front", "rear", "right", "left", "up" and "down", respectively.

Embodiment 1

Figure 1:
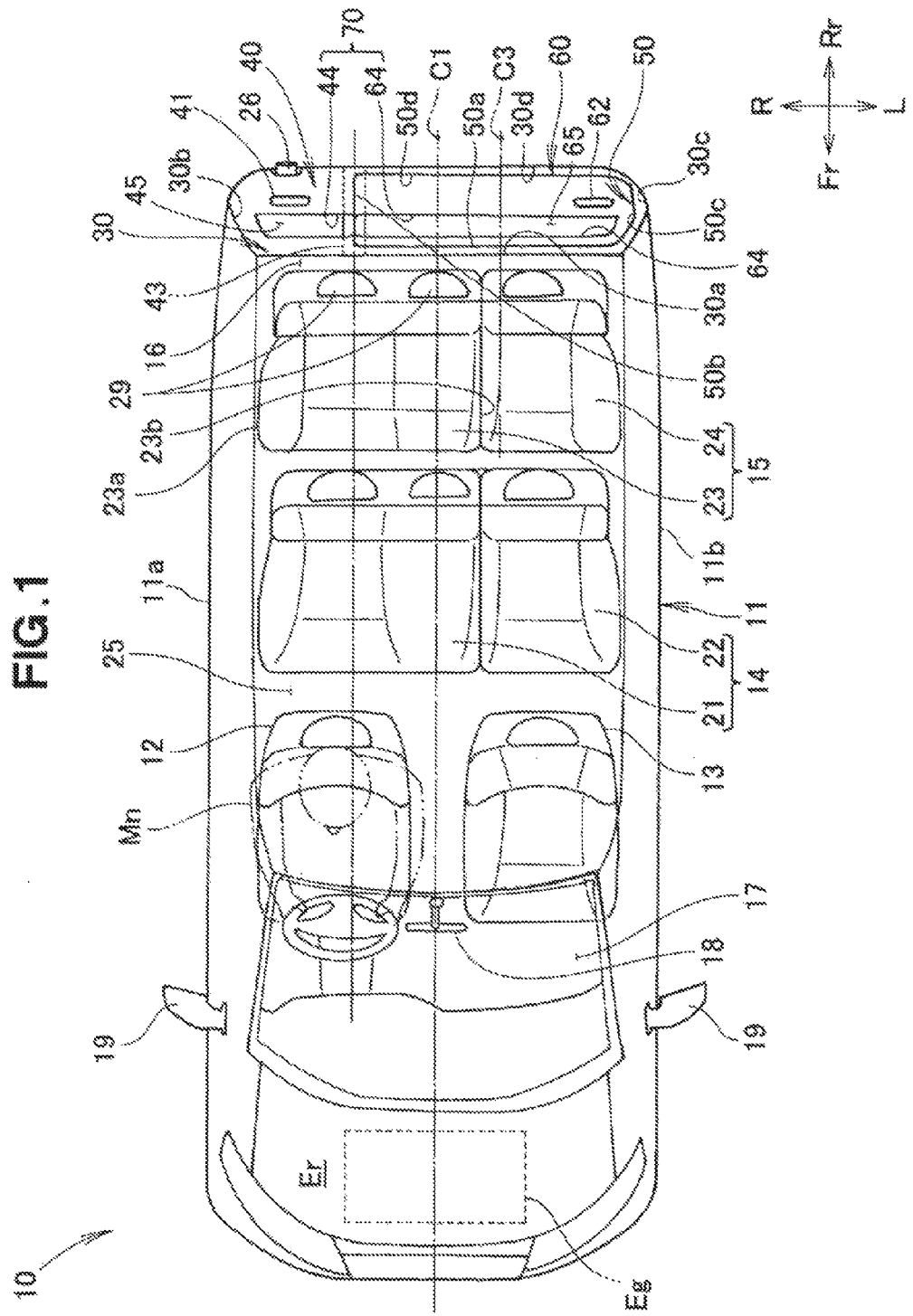
FIG. 1 is a partially cut-away top plan view illustrating a vehicle according to a first embodiment of the present invention.

FIG. 1 shows a vehicle 10 that is, for example, a right-handle-drive wagon. Three rows of seats are provided in a passenger compartment 25 in a front-to-rear direction of a vehicle body 11. An engine Eg as a travel drive source is mounted in an engine room Er that is in turn disposed in front of the passenger compartment 25. As will be detailed later, the travel drive source constitutes a part of a travel drive system.

More specifically a driver seat 12 and a front passenger seat 13 are provided as the first row of seats in the passenger compartment 25. The driver seat 12 and the front passenger seat 13 are provided separately on opposite sides, or in such a manner as to sandwich therebetween, of a centerline C1 extending in a vehicle body front-rear direction centrally across the width of the vehicle. Namely, the driver seat 12 and the front passenger seat 13 are disposed offset relative to the centerline C1. In the right-handle-drive vehicle, the driver seat 12 is disposed to the right of the centerline C1, while the passenger seat 13 is disposed to the left of the centerline C1.

Each of the second row of seats 14 and the third row of seats 15 extends in a vehicle width direction and is capable of seating three passengers. The second row of seats 14 comprises a wide main seat 21 capable of seating two persons, and a sub seat 22 smaller in width than the main seat 21 and capable of seating only one person. Likewise, the third row of seats 15 comprises a wide main seat 23 capable of seating two persons, and a sub seat 24 smaller in width than the main seat 23 and capable of seating only one person.

The sub seat 22 of the second row and the sub seat 24 of the third row are each bendable or collapsible toward a left end portion of the vehicle body 11. A mechanism by which the sub seats 22 and 24 are bent may be any one of the well-known mechanisms. A state of the sub seat 24 deployed to allow a person or passenger to be seated in the seat 24 will be referred to as "deployed state", while a state of the sub seat 24 collapsed so that a passenger is allowed to pass along a side of the main seat 23 will be referred to as "retracted state".

Hereinafter, the main seat 21 of the second row will be referred to as "front-side seat 21", the sub seat 22 of the second row will be referred to as "front-side sub seat 22", and the main seat 23 of the third row will be referred to as "seat 23".

A trunk or baggage room 16 for storing baggage is formed behind the third row of seats 15. A tailgate 40 is pivotably mounted for permitting loading and unloading of baggage to and from the baggage room 16. The baggage room 16 constitutes a part of the passenger compartment 25.

A rearview mirror 18 for the vehicle occupant or driver Mn to check an area behind the vehicle is mounted on the centerline C1 of a front window 17. Side mirrors 19 for the driver to check areas behind and to the right and left of the vehicle are mounted on left and right end portions of a front section of the vehicle body 11.

Now, the vehicle 10 will be described in greater detail with reference to FIGS. 2 to 4.

Figure 2:
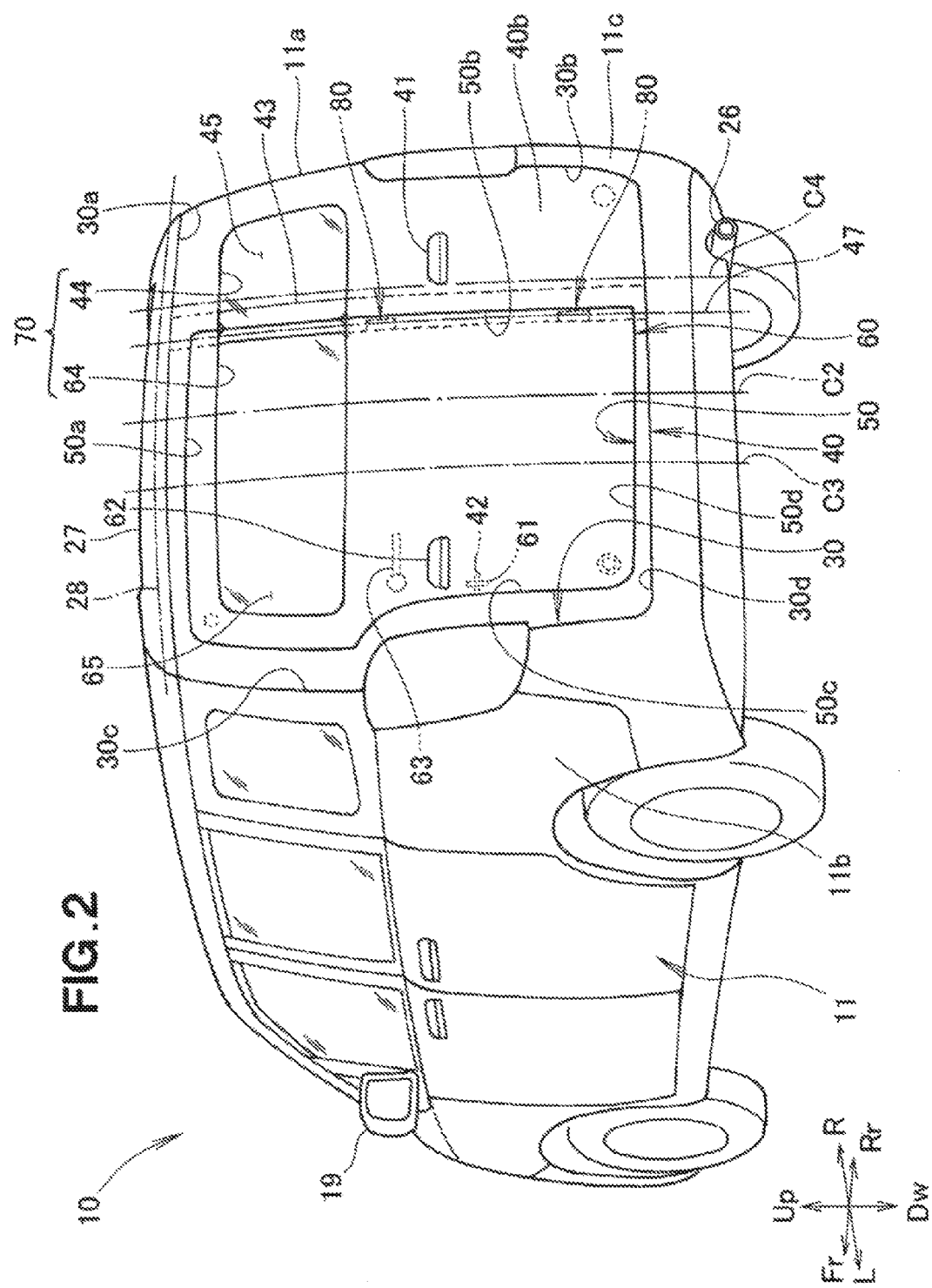
FIG. 2 is a perspective view of the vehicle shown in FIG. 1.
Figure 3:
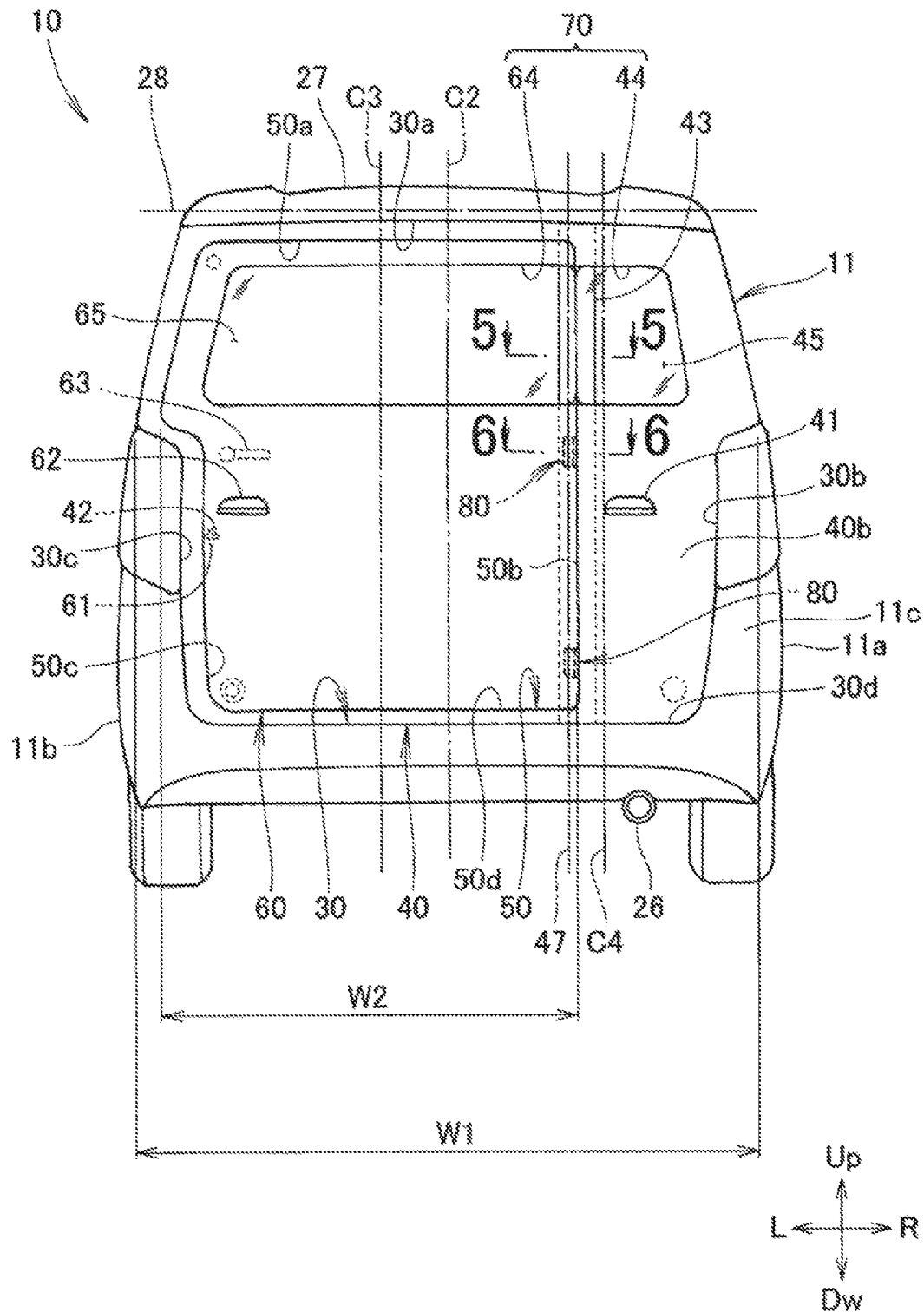
FIG. 3 is a rear view of the vehicle shown in FIG. 1.

As shown in FIGS. 2 to 4, a rear opening 30 is formed in the rear surface of the vehicle 10 to extend over substantially entire ranges both in the vehicle width direction and in a vertical or up-down direction. The tailgate 40 is mounted so that the rear opening 30 can be opened and closed by the tailgate 40. When the rear opening 30 is closed by the tailgate 40, the tailgate 40 constitutes a part of the rear surface of the vehicle 10. An entrance/exit opening 50 is formed in the tailgate 40 to extend over a substantially entire vertical length of the tailgate 40 and extend over a part of the width of the tailgate 40. The entrance/exit opening 50 is an opening formed for passengers to get in and out of the vehicle. A door 60 is mounted on the entrance/exit opening 50 in such a manner that the entrance/exit opening 50 can be opened and closed by the door 60.

An exhaust port 26 is exposed from the rear surface of the vehicle 10. The exhaust port 26 is a distal end portion of an exhaust system that functions to emit exhaust gas (discharge), produced in the engine (depicted at Eg in FIG. 1) to outside the vehicle. The exhaust port 26 is offset from the entrance/exit opening 50 toward the driver seat. In other words, the exhaust port 26 is located closer to the right end of the vehicle body 11 than a centerline C4 between the centerline C2, in the vehicle width direction of the vehicle body 11 (widthwise centerline C2) and the right end of the vehicle body 11.

The rear opening 30, which is formed in the rear surface of the vehicle 10 has a generally rectangular shape (or generally square shape), has: an upper edge 30a formed near a roof 27 of the vehicle body 11 to extend in the vehicle width direction; left and right side edges 30b and 30c extending downward from the opposite ends of the upper edge 30a ("b" is a suffix representing the right side edge and "c" is a suffix representing the left side edge); and a lower edge 30d interconnecting the respective lower ends of the left and right side edges 30b and 30c.

The tailgate 40 is vertically pivotably mounted on a first opening/closing shaft 28 provided on an upper end portion of the vehicle body 11 and extending horizontally. A tailgate knob 41 (opening operation means 41) capable of operating the tailgate 40 is provided on the outer surface of the tailgate 40. A person can pivot the tailgate 40 in the vertical direction by holding the tailgate knob 41. The tailgate 40 can be maintained in a closed position by means of a latch device. Latching by the latch device can be canceled by the operation of the tailgate knob 41.

The tailgate knob 41 is provided only on the outer surface of the tailgate 40; that is, no such tailgate knob 41 is provided on the inner surface of the tailgate 40. This is for the purpose of preventing a passenger from mistakenly opening, from inside the passenger compartment, the tailgate 40 mounted over a substantially entire width of the vehicle. A door lock striker 42 for maintaining the door 60 in a closed position is mounted on a left end portion of the tailgate 40.

A pillar 43 is provided near the entrance/exit opening 50, formed in the tailgate 40, and extends over a substantially entire length in the vertical direction or up-down direction of the tailgate 40. The pillar 43 is formed integrally with the tailgate 40, so that it is possible to achieve an increased rigidity against external force that may be input from behind the vehicle 10.

Because the entrance/exit opening 50 is formed over a substantially entire length in the vertical direction, the tailgate 40 has a small strength as compared to a case where no entrance/exit opening 50 is provided in the tailgate 40. Because of the small strength of the tailgate 40, elastic deformation may occur in a peripheral edge portion of the entrance/exit opening 50 due to vibration force input from a road surface during travel of the vehicle. To cope with the vibration force, the pillar 43 in the embodiment is provided along a vertical side edge of the entrance/exit opening 50. With the pillar 43 provided along the side edge of the entrance/exit opening 50 over the substantially entire vertical length as above, it is possible to increase the strength of the tailgate 40 and minimize occurrence of elastic deformation.

Further, a tailgate window section 44 that is an opening for passengers to visually check, from within the passenger compartment, areas outside the vehicle is formed in an upper portion of the tailgate 40. The tailgate window section 44 is covered with a tailgate window panel 45 formed of glass. The tailgate window panel 45 not only covers the tailgate window section 44 but also covers a surface of the pillar 43 facing the outside of the vehicle.

A remaining rear surface portion 40b is formed on a portion of the rear surface of the tailgate 40 other than a vehicle body rear portion 11c forming a rear surface peripheral edge portion and other than the entrance/exit opening 50. The exhaust port 26 is offset in the vehicle width direction from the entrance/exit opening 50 and located only at a position vertically overlapping the remaining rear surface portion 40b. In the vehicle 10 where the tailgate 40 is provided along the entire inner periphery of the vehicle body rear portion 11c, the remaining rear surface portion 40b can be said to be a portion of the tailgate other than the entrance/exit opening 50.

Further, the entrance/exit opening 50, which has a substantially rectangular shape, has: an upper edge 50a extending along the upper edge 30a of the rear opening 30; a side edge 50b extending downward from one end of the upper edge 50a along the pillar 43; a side edge 50c extending downward from the other end of the upper edge 50a along the side edge 30c of the rear opening 30; and a lower edge 50c interconnecting the respective lower ends of the side edges 50b and 50c.

The centerline C2 extending in the vertical or up-down direction centrally across the width of the vehicle (widthwise centerline C2 of the vehicle body), is sandwiched between the side edges 50b and 50c of the entrance/exit opening 50. Namely, the side edges 50b and 50c of the entrance/exit opening 50 are offset from the widthwise center of the vehicle. The entrance/exit opening 50 formed in the tailgate 40 has a width (i.e., dimension in the vehicle width direction) that is of course smaller than a width of the rear opening 30. The centerline C2 extending in the vertical direction perpendicularly intersects the above-mentioned first opening/closing shaft 28. The side edges 50b and 50c of the entrance/exit opening 50 are located closer to the centerline C2 extending centrally across the width of the vehicle than the centerline C4 between the centerline C2 and the right end of the vehicle body 11.

A centerline C3 extending centrally across the width of the entrance/exit opening 50 is offset leftward from the widthwise centerline C2 of the vehicle body extending in the vertical direction. Namely the widthwise centerline C3 of the entrance/exit opening 50 is offset from the centerline C2, extending in the vertical direction centrally across the width of the vehicle (widthwise centerline of the vehicle body 11), toward the front passenger seat.

The door 60 is a horizontally-openable door supported by the pillar 43 via two hinges 80. A shaft 47 extending in the vertical direction centrally through the two hinges 80 will hereinafter be referred to as "second opening/closing shaft 47". The door 60 is pivotable about the second opening/closing shaft 47 in the horizontal and front-rear directions of the vehicle body 11.

A door latch 61 is mounted on a left end portion of the door 60. The door latch 61 can engage the striker 42 to maintain the door 60 in the closed position. The door latch 61 can disengage the striker 42 in response to an operation of an outer handle 62 pivotably mounted on the outer surface of the door 60 or an inner handle 63 (canceling operation means 63) pivotably mounted on the inner surface of the door 60. The striker 42, the door latch 61, the outer handle 62 and the inner handle 63 may each be of a well-known construction.

A human operator can cancel a locked state of the door 60 by pivoting the outer handle 62 or the inner handle 63 and thereby pivot the door 60. The door 60 pivots in a direction from the left side edge 50c (located adjacent to the main passenger seat) of the entrance/exit opening 50 toward the widthwise center. Namely, the left side edge 50c of the entrance/exit opening 50 is an opening start end that starts to be opened by the door 60.

The outer handle 62 and the inner handle 63 are both provided adjacent to the opening start end that starts to be opened by the door 60 and overlap each other with respect to the vehicle width direction. The operation for opening the door 60 can be performed at a position near the opening start end irrespective of which the door 60 is opened from inside the vehicle or from outside the vehicle, and thus, an enhanced operability is achievable. The inner handle 63 is mounted at a higher position than the outer handle 62.

A door window section 64 for the passengers to check, from within the passenger compartment, areas outside the vehicle, is formed in an upper portion of the door 60 in succession with the tailgate window section 44. The door window section 64 is covered with a door window panel 65 formed of glass.

The tailgate window section 44 and the door window section 64 have the same height dimension (i.e., same length in the vertical or up-down direction) but also are located at the same position in the up-down direction. Thus, the tailgate window section 44 and the door window section 64 extend successively in the vehicle width direction. The tailgate window section 44 and the door window section 64 will hereinafter be referred to collectively as "window section 70". Such a window section 70 is formed along a substantially entire width of the vehicle. Needless to say, the window section 70 is formed at least in a central portion of the width of the vehicle. The pillar 43 is formed between the side edge 50b of the entrance/exit opening 50 located near the tailgate window section 44 and the tailgate window section 44 and extends continuously over the entire vertical length of the tailgate 40.

Referring now particularly to FIG. 3, the entrance/exit opening 50 opens over a range more than half the width of the tailgate 40. More specifically, a ratio of a width W2 of the entrance/exit opening 50 to the width W1 of the tailgate 40 is 0.7:1, i.e. W2=0.7×W1.

By securing the width of the entrance/exit opening 50 greater than half the width of the rear opening 30, it is possible to secure a space sufficient for baggage loading/unloading and a sufficient space for person's getting-in/out of the vehicle. By limiting an amount of rearward projection of the door 60, it is possible to prevent any installed objects from interfering with the door 60.

Referring now particularly to FIG. 4, if a plane extending in the vehicle body front-rear direction while passing through the centerline C2 extending in the vertical direction centrally across the widthwise center of the tailgate 40 is referred to as "central plane CP", the window section 70 is formed in a position overlapping the central plane CP.

Referring now to FIGS. 1 and 3, the side edge 50c of the entrance/exit opening 50 extending along one widthwise end of the vehicle is located opposite the driver seat 12 with respect to the centerline C1 extending in the vehicle body front-rear direction and the widthwise centerline C2 extending in the vertical direction of the vehicle body. The side edge 50b of the entrance/exit opening 50 closer to the widthwise center, on the other hand, is located on the same side as the driver seat 12 with respect to the centerline C1 extending in the vehicle body front-rear direction and the widthwise centerline C2 extending in the vertical direction of the vehicle body.

As viewed from the rear of the vehicle body 11, the pillar 43 and the second opening/closing shaft 47 are provided at positions overlapping the driver seat 12. The second opening/closing shaft 47 extends alongside the side edge 50b of the entrance/exit opening 50. The side edge 50b of the entrance/exit opening 50 can be said to be a driver seat-side side edge.

Note that examples of the discharge emitted via the exhaust port 26 include water as well as exhaust gas. In fuel cell vehicles, water produced in a fuel cell stack is emitted to the outside via the exhaust port 26. Namely the travel drive source system includes a fuel cell stack as an energy source for activating a motor. In the present invention, the travel drive source system includes a travel drive source and this energy source.

The door window panel 65 may be formed of any other material than glass, such as resin, as long as it is a transparent panel. The door window panel 65 will hereinafter be referred to as "door window glass 65" as appropriate.

Referring now back to FIG. 1, the seat 23 is located adjacent to the rear surface of the vehicle 10, and the right end of the seat 23 is located proximate the right end of the vehicle body 11. Namely, one end 23a, in the vehicle width direction, of the seat 23 is located proximate to one end 11a, in the vehicle width direction, of the vehicle body 11 and overlaps the remaining rear surface portion (40b in FIG. 2). The other end 23b, in the vehicle width direction, of the seat 23, on the other hand, overlaps the entrance/exit opening 50 in the vehicle width direction and is located closer to the one end 11a of the vehicle body 11 than the widthwise centerline C3 of the entrance/exit opening 50.

Two headrests 29 are provided on an upper portion of the seat 23, and one of the headrests 29 that is located on the widthwise centerline C1 extending in the front-rear direction centrally across the width of the vehicle overlaps the entrance/exit opening 50 in the front-rear direction.

The sub seat 24 disposed in succession with the seat 23 extends from the other end 23b, in the vehicle width direction, of the seat 23 toward the other end 11b, in the vehicle width direction, of the vehicle body 11.

The outer handle 62 is disposed at a position away from the seat 23 as viewed in the vehicle width direction. As shown also in FIG. 4, the inner handle 63 overlapping the outer handle 62 in the vehicle width direction is also mounted at a position away from the seat 23.

Figure 5:
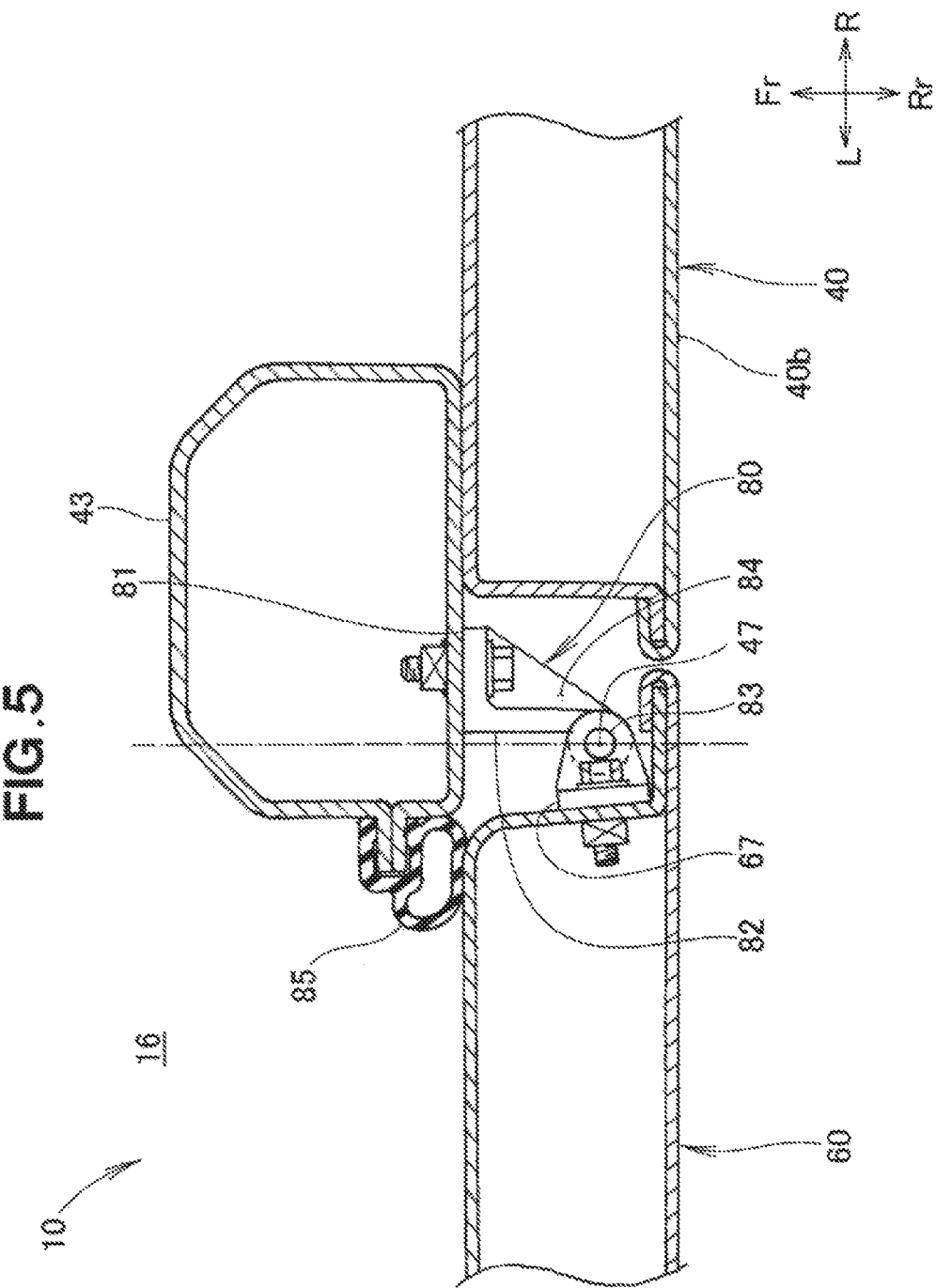
FIG. 5 is a sectional view taken along line 5-5 of FIG. 3.

The following describe, with reference to FIG. 5, a structure for mounting the door 60 in the embodiment.

As shown in FIG. 5, the door 60 is supported by the pillar 43 of a closed section via the hinges 80. On the pillar 43 are mounted a seal member 85 for sealing between the door 60 and the interior of the passenger compartment and the hinges 80. The closed section of the pillar 43 can increase rigidity of the pillar 43.

Each of the hinges 80 has a generally L shape and includes: a bottom section 81 fixed to the pillar 43; an arm section 82 extending from the bottom section 81 toward the rear of the vehicle body; a pin 83 mounted on a distal end portion of the arm section 82 for pivotably supporting the door 60; and a reinforcement section 84 extending between the bottom section 81 and the arm section 82 to reinforce the bottom section 81 and the arm section 82. A mounted member 67 is fastened to the door 60 and has the pin 83 passed therethrough.

The door 60 is mounted on the tailgate 40 via the hinges 80 in such a manner that it is pivotable in the vehicle body front-rear direction. Because the door 60 is pivotably supported via the hinges 80, the supporting structure for the door 60 can be simplified.

In addition, because the door 60 is supported by the pillar 43 via the hinges 80, supported rigidity of the door 60 can be increased.

Figure 6:
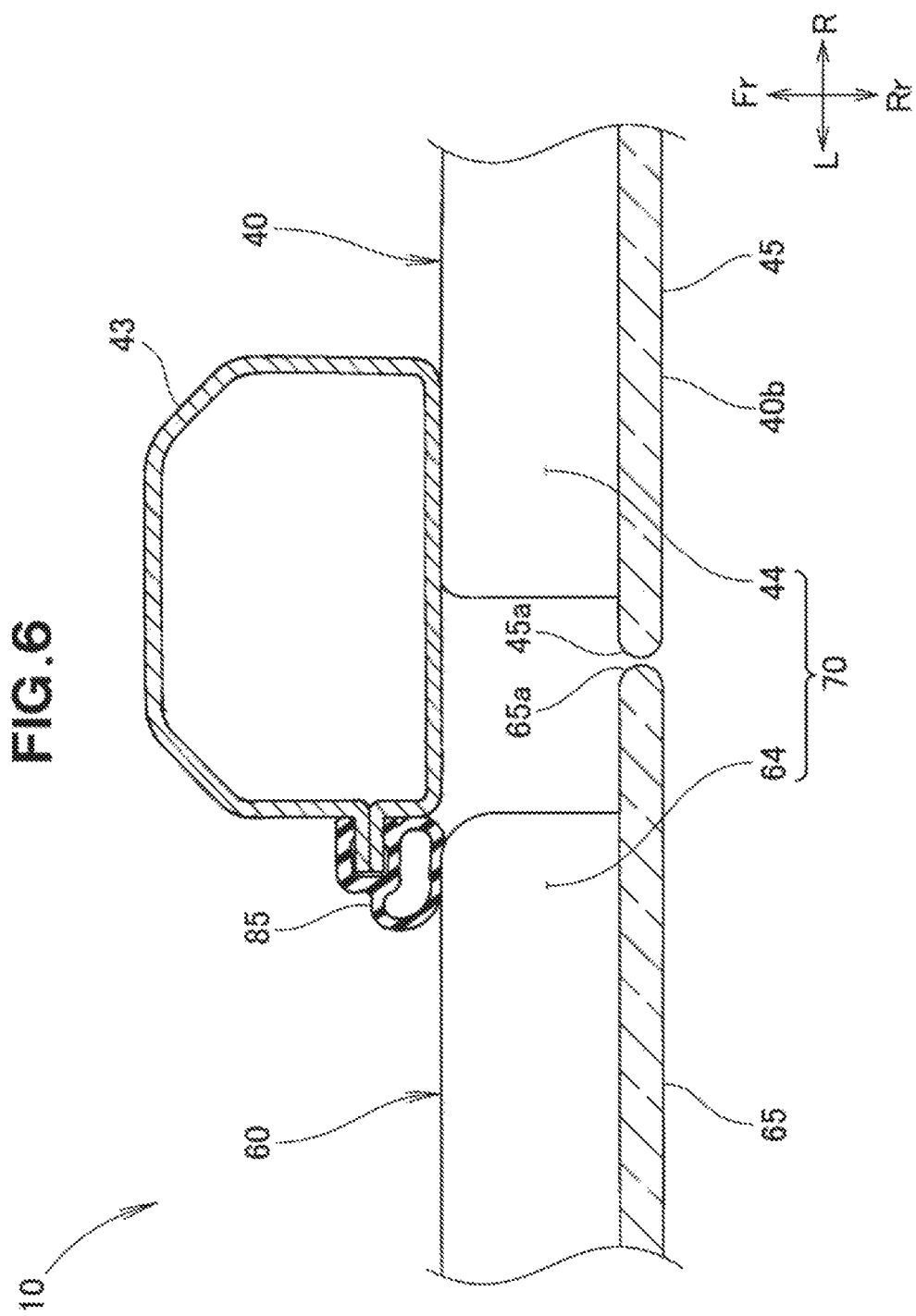
FIG. 6 is a sectional view taken along line 6-6 of FIG. 3.

The following describe, with reference to FIG. 6, details of the tailgate window glass 45 and the door window glass 65.

As shown in FIG. 6, respective one edges 45a and 65a of the tailgate window glass 45 and the door window glass 65 are directly opposed to each other, so that, as viewed from the rear of the vehicle 10, the tailgate window glass 45 and the door window glass 65 can be seen as an integral glass and thus aesthetic quality of the vehicle can be enhanced.

In addition, the respective one edges 45a and 65a of the tailgate window glass 45 and the door window glass 65 each have an arcuate sectional shape. The door window glass 65 pivots together with the door 60. The arcuate sectional shape of each of the edges 45a and 65a can prevent the edges 45a and 65a from interfering with each other as the door window glass 65 pivots. Because interference between the edges 45a and 65a can be prevented as above, the respective one edges 45a and 65a of the tailgate window glass 45 and the door window glass 65 can be placed even closer to each other, so that the aesthetic quality of the vehicle can be further enhanced.

Now, operation of the vehicle 10 will be described with reference to FIGS. 7 and 8.

Figure 7:
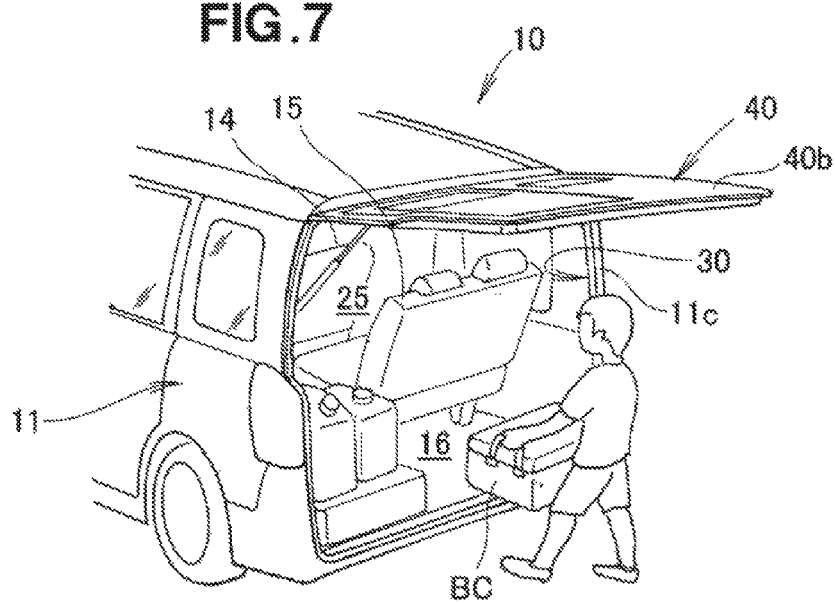
FIG. 7 is a view explanatory of operation of the vehicle when a tailgate is in an opened position.

When large-size baggage BC is to be loaded into the vehicle 10, the tailgate 40 is pivoted upward as shown in FIG. 7. Because the rear opening 30 opens over the entire rear surface of the vehicle 10, the large-size baggage can be loaded into the vehicle 10 with ease.

Figure 8:
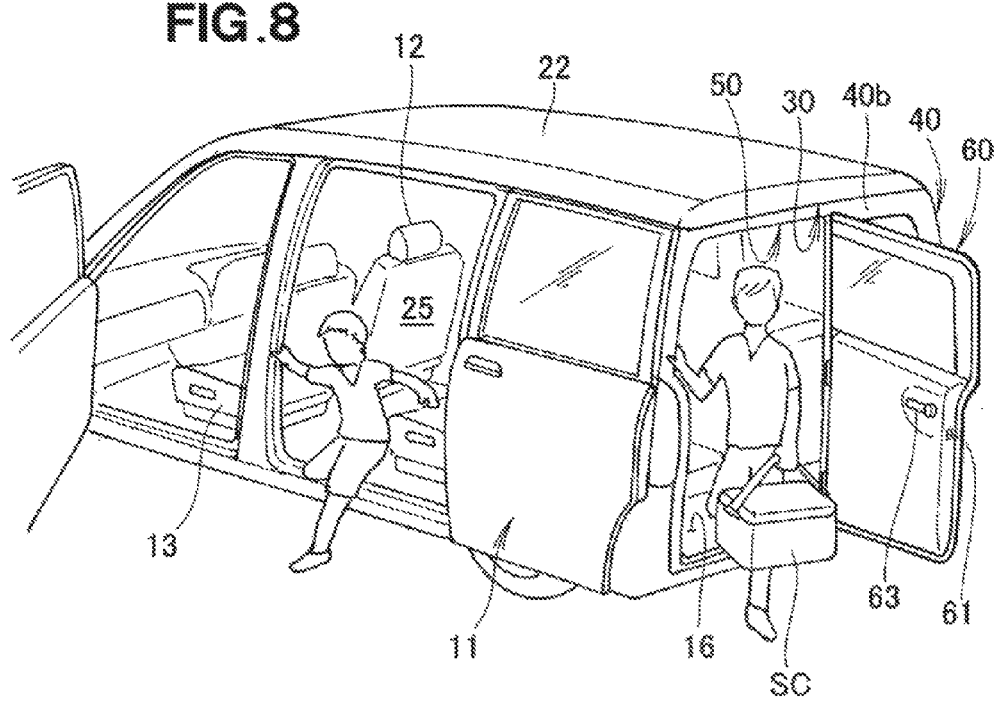
FIG. 8 is a view explanatory of operation of the vehicle when a door shown in FIG. 1 is in an opened position.

As shown in FIG. 8, the rear opening 30 opens over a generally entire range in the height direction of the rear surface of the vehicle 10, and the entrance/exit opening 50 opens over a generally entire range in the height direction of the tailgate 40. A person can get in or get out of the vehicle through a rear portion of the vehicle 10 using the entrance/exit opening 50.

Particularly, the inner handle 63 capable of unlatching (canceling the latching by) the door latch 61 is provided on the inner surface of the door 63. Thus, the door 60 can be opened and closed by operations performed from the interior of the vehicle, and a passenger can get out of the vehicle through the rear section of the vehicle. Namely, because passengers can get in and out of the vehicle through the rear section of the vehicle, the ease of getting in/out of the vehicle can be enhanced.

In addition, when small-size baggage SC is to be loaded into the vehicle 10, the door 60 is pivoted in the horizontal direction. At that time, the door 60 starts to open from the side edge 50c of the entrance/exit opening 50. Because the door 60 is a part of the tailgate 40 and thus lighter in weight than the tailgate 40, opening and closing operations of the door 60 can be performed with ease, so that enhanced operability of the door 60 is achievable.

With reference to the aforementioned figures and FIG. 3 as well, the following can be said.

The entrance/exit opening 50 opens over the entire range in a substantially left half of the tailgate 40. Loading/unloading small baggage SC with the door 60 in the opened position is performed through the entrance/exit opening 50, and the hinges 80 for supporting the door 60 are provided on portions of the tailgate 40 where the entrance/exit opening 50 is not formed. With the entrance/exit opening 50 formed in the entire range of the substantially left half of the tailgate 40 as above, it is possible to secure a sufficient space for mounting the door-supporting hinges 80 while simultaneously securing a necessary area of the opening for loading/unloading of small baggage SC. The vehicle 10 having such an entrance/exit opening 50 can attain advantageous benefits set forth below with reference to the following figures.

As shown in FIG. 9(a), the exhaust port 26 is offset, in the vehicle width direction, from the entrance/exit opening 50. Thus, a passenger can get in or get out of the vehicle while appropriately avoiding the exhaust port 26, i.e. avoiding discharge, such as exhaust gas and water. Therefore, the vehicle 10 can be said to be a vehicle providing has an improved ease with which passengers can get in and get out of the vehicle, i.e. an improved ease of getting in and out of the vehicle.

Further, the widthwise centerline C3 of the entrance/exit opening 50 and the exhaust port 26 are disposed in such a manner as to sandwich therebetween the widthwise centerline C2 of the vehicle body 11. In this manner, the entrance/exit opening 50 and the exhaust port 26 can be spaced from each other by a sufficient distance, and thus, the exhaust port 26 can be located at a sufficient distance from a passenger getting in or out of the vehicle 10.

In addition, of the left and right side edges 50b and 50c of the entrance/exit opening 50, the left side edge 50c adjacent to the other end 11b of the vehicle body 11 is the opening start end that starts to be opened by the door 60. Namely, the door 26 starts to open from the side edge 50c remote from the seat 23. Thus, even when an opened amount of the door 60 is small, a passenger can readily get in or out of the vehicle 10 through the door 60. Conversely, if the opening start end is the side edge 50b closer to the seat 23, it is necessary to open the door 60 to a greater opened amount such that the seat 23 does not hinder a passenger from getting in or out of the vehicle 10. Therefore, the aforementioned construction where the door 26 starts to open from the side edge 50c remote from the seat 23 can secure a high ease of getting in and out of the vehicle 10.

Further, the side edge 50c can also be said to be a side edge of the left and right side edges 50b and 50c that is remote from the exhaust port 26. Because the door 60 is opened from the side edge 50c remote from the exhaust port 26, a passenger can get in or out of the vehicle while more reliably avoiding discharge, such as exhaust gas and water.

Referring to the above-mentioned figures and FIG. 1 as well, the outer handle 62 for opening and closing the door 60 is mounted near the side edge 50c functioning as the opening start end. Because the outer handle 62 is located adjacent to the opening start end, a passenger can get in or out of the vehicle 10, without approaching the exhaust port 26 when opening the door 60 from outside the vehicle 10.

In addition, the inner handle 63 is provided at such a position as to avoid (i.e., as to not overlap) the seat 23 when the door 60 is in the closed position. Thus, it is possible to prevent the seat 23 from interfering with the locked-state canceling operation of the inner handle 63.

Further, the inner handle 63 is provided to be located closer to the other end 11b of the vehicle body 11b than the widthwise centerline C3 of the entrance/exit opening 50 when the door 60 is in the closed position. Because the inner handle 63 is provided adjacent to the opening start end of the door 60, a human operator or passenger operating the inner handle 63 is located adjacent to the opening start end, so that getting in and out of the vehicle 10 can be done with an increased smoothness.

Further, as shown in FIG. 9(b), the sub seat 24 located alongside the seat 23 is constructed to be displaceable so that a passenger can pass along a side of the seat 23. With such a construction, a passenger having got in the vehicle can be readily seated, although the vehicle 10 is of the type allowing a passenger to get in or out of the vehicle through the rear portion of the vehicle body 11; thus, the vehicle 10 allows many passengers to get in the vehicle 10.

In addition, the other end 23b, in the vehicle width direction, of the seat 23 is located at a position overlapping the entrance/exit opening 50 in the vehicle width direction. Thus, a passenger can get in or out of the vehicle 10 while holding the seat 23 as necessary. In this manner, the vehicle 10 can provide a high ease of getting in and out of the vehicle 10.

Further, one of the headrests 29 is located centrally in the vehicle width direction. Thus, a tall passenger can get in the vehicle 10 while holding the headrest 29 as necessary, which is very convenient.

It is preferable that the seat 23 be disposed at a short distance from the entrance/exit opening 50 such that a passenger can hold the seat 23 when getting in the vehicle.

Particularly it is desirable that the sub seat 24 is collapsible toward the other end 11b of the vehicle 11 so that a passenger getting in or out of the vehicle can hold the collapsed sub seat 24. Such a construction can even further enhance the ease of getting in/out of the vehicle. As an example, the sub seat 24 may be collapsed by means of a so-called lip-up mechanism.

Further, the headrest 29 is disposed to overlap the entrance/exit opening 50. By providing a part, capable of being held by a passenger getting in or out of the vehicle, additionally at a higher position too, it is possible to enhance the ease of getting in/out of the vehicle for a tall passenger and hence enhance the ease of getting in/out of the vehicle for more passengers.

In addition, the front-side seat 21 is provided forward of the seat 23, but also the front-side sub seat 22 is provided forward of the sub seat 24. The front-side sub seat 22 is displaceable so that a passenger can pass along a side of the front-side seat 21. With such a construction, any passenger to be seated in another seat than the seat 23 can get in or out of the vehicle through the entrance/exit opening 50. Thus, more passengers can get in and out of the vehicle through the entrance/exit opening 50.

Further, by displacing (retracting or collapsing) both of the sub seat 24 and the front-side sub seat 22, it is possible to load long baggage LC, such as a surfboard, through the entrance/exit opening 50.

Referring to the above-mentioned figures and FIG. 1 as well, the seat 23 has a greater width (seat width) than the sub seat 24. Thus, many passengers can be seated without the sub seat 24 being deployed. If all passengers can be seated in the seat 23, there is no need to deploy the sub seat 24 from the retracted position. Namely, by forming the seat 23 to a large seat width, it is possible to increase the number of passengers who can be seated in the seat 23 and eliminate the need for deploying the sub seat 24.

Furthermore, the other end 23b, in the vehicle width direction, of the seat 23 is located closer to the one end 11a of the vehicle body 11 than the widthwise centerline C3 of the entrance/exit opening 50. Namely, a length over which the seat 23 overlaps the entrance/exit opening 50 is less than half the width of the entrance/exit opening 50. By thus reducing the range over which the seat 23 overlaps the entrance/exit opening 50, it is possible to secure a wide passage for passengers in the passenger compartment, and thus, the ease of getting in/out of the vehicle can be even further enhanced. In addition, the seat 23 and the inner handle 63 can be spaced from each other by a sufficient distance, and thus, it is possible to even more reliably prevent the seat 23 from interfering with the inner handle 63 during the operation of the inner handle 63.

Now, with reference to FIGS. 10 and 11, a description will be given about operation of the vehicle 10 during travel.

In a case where a pillar 143 extends centrally across the width of the vehicle width as seen in a comparative example of FIGS. 10(a) and 11(a), the pillar 143 would overlap most of another vehicle OC (following vehicle OS) traveling behind the vehicle. Thus, it is difficult for the driver of the vehicle to visually check the other vehicle OC via a room mirror 118. Particularly, if a distance between the vehicle and the other vehicle OC traveling behind the vehicle has got relatively large, the other vehicle OC would completely overlap the pillar 143, and thus, it is likely that the other vehicle OC cannot be visually checked by the driver.

Note that hatched areas sandwiched by lines extending from the room mirror 118 as shown in FIG. 10(a) are areas where the other vehicle OC can be visually checked via the room mirror 118. Namely an area between the hatched areas is where a field of view is blocked by the pillar 143.

As seen in the embodiment of the present invention of FIGS. 10(b) and 11(b), the pillar 43 is disposed on the right half (on the driver-seat side) of the vehicle body 11 blocks a part of a field of view of the room mirror 18. However, because the pillar 43 is offset rightward from the centerline of the vehicle body, the driver can visually check, via the room mirror 18, another vehicle OC traveling behind the vehicle 10.

In addition, when another vehicle OC is traveling behind the vehicle 10 on a lane outward of the lane on which the vehicle 10 is traveling, as shown in FIG. 10(c), the driver can check the following vehicle OC via the side mirror 19. Even when the vehicle 10 is traveling on a curve, as shown in FIG. 10(d), the driver of the vehicle 10 can sufficiently check a following vehicle OC.

The following describe operation of the vehicle 10 when the vehicle 10 is driven rearward.

Figure 12:
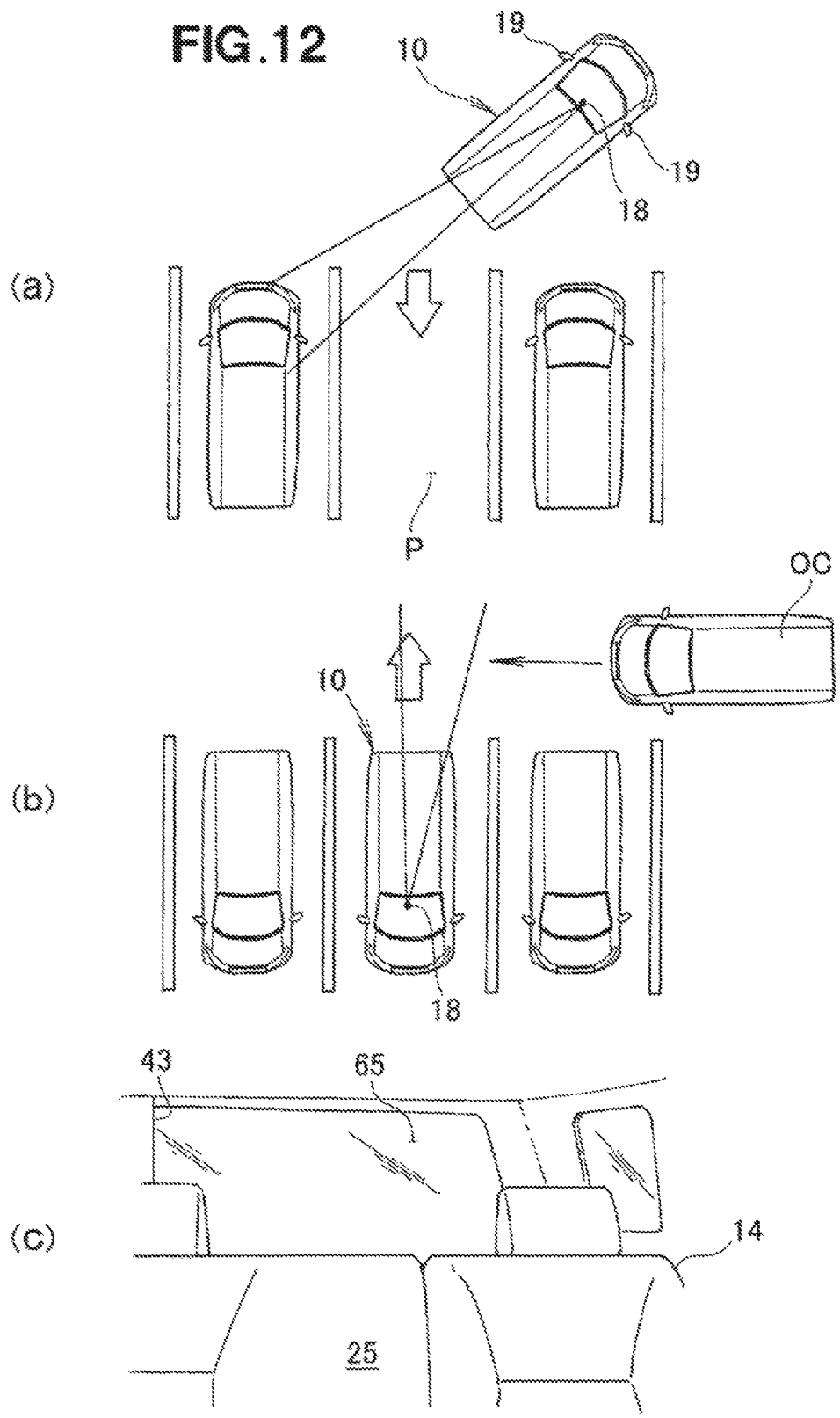
FIG. 12 is a view explanatory of operation of the vehicle shown in FIG. 1 during parking of the vehicle.

The vehicle 10 may sometimes be driven backward to be parked in a parking lot of a store as shown in FIG. 12(a), or driven backward to a place where another vehicle OC is traveling from a side opposite the driver seat of the vehicle 10 as shown in FIG. 12(b) like in a service area of an expressway.

Even when the vehicle 10 is driven backward like this, the driver can get a wide field of view because the pillar 43 is disposed at a position overlapping the driver seat as seen in FIG. 12(c).

Referring to FIG. 3 in addition to FIGS. 10 and 11, the following can be said.

In the instant embodiment, the side edges 50b and 50c of the entrance/exit opening 50 are located at positions avoiding the widthwise center C2 of the vehicle body 11, and the window 70 is provided across the widthwise center C2. Namely, the window 70 is provided at least in the widthwise central position C2 of the tailgate 40, and thus, a minimum necessary field of view can be secured. With the side edges 50b and 50c of the entrance/exit opening 50 located at positions avoiding the window 70 of the vehicle body 11, it is possible to prevent the side edges 50b and 50c of the entrance/exit opening 50 from blocking the field of view. Namely the vehicle 10 of the present invention can be said to be a vehicle capable of securing a high visibility of areas outside the vehicle despite the provision of the door 60.

In addition, the door window section 64 is formed over a region between two ends, in the vehicle with direction, of the door 60, i.e. two opposite widthwise ends of the vehicle, while the tailgate window section 44 is formed over a region, in the vehicle with direction, of the tailgate 40 where the door window section 64 is not formed. Namely, the window section 70 is formed over the substantially entire range in the vehicle width direction. By thus forming the window section 70 in the wide range while preventing the side edges 50b and 50c of the entrance/exit opening 50 from blocking the field of view, a higher visibility of areas outside the vehicle can be secured.

The tailgate window section 44 and the door window section 64 are located at generally the same height position in the tailgate 40. Namely, the tailgate window section 44 and the door window section 64 are formed in succession so that a substantially continuous field of view can be obtained at a given height of the tailgate 40.

Further, referring to FIG. 1, the following can be said.

In the vehicle body 11, the driver seat 12 is offset from the widthwise centerlines C1 and C2, and the pillar 43 (i.e., second opening/closing shaft 47) is provided at a position overlapping the driver seat 12 as viewed from the rear of the vehicle body 11. A portion overlapping the driver seat 12 in the front-rear direction of the vehicle 10 is a portion difficult for the human driver MN to see. Namely, the pillar 43 (second opening/closing shaft 47) is provided avoiding a portion that easily comes into a field of vision of the human driver MN. By thus avoiding a portion that easily comes into a field of vision of the human driver MN, an appropriate field of vision of the human driver MN can be secured.

In addition, the side edge 50b, closer to the vehicle width center, of the entrance/exit opening 50 is located closer to the driver seat 12 than the widthwise centerlines C1 and C2, and thus, a boundary between the door window section 64 and the tailgate window section 44 is also located closer to the driver seat 12. By positioning the boundary between the door window section 64 and the tailgate window section 44 being located at a portion difficult for the human driver MN to see, it is possible to secure a more appropriate field of vision of the human driver MN.

The following describe, with reference to FIGS. 13 to 15, operation of the door 60.

FIG. 13(a) shows a vehicle 200 having only a tailgate 240, where the tailgate 240 has to be opened whenever baggage is to be loaded or unloaded to or from the vehicle 200. As the tailgate 240 is opened, it projects to the rear of the vehicle by an amount corresponding to a height dimension of the tailgate 240.

The embodiment of the vehicle 10, on the other hand, includes the door 60 mounted on a part of the tailgate 40, as shown in FIG. 13(b). If the width of the door 60 is smaller than a height dimension of the tailgate 40, an amount of projection of the door 60 toward the rear of the vehicle when the door 60 rather than the tailgate 40 is opened can be reduced by an amount 6 as compared to an amount of projection of the tailgate 40 when the tailgate 40 is opened. By thus reducing the amount of projection to the rear of the vehicle 10, it is possible to prevent installed objects around the vehicle 10 from interfering with opening/closing of the door 60. Namely, only a small space suffices for baggage loading/unloading operation.

As shown in FIG. 14(a), another comparative example of a vehicle 300 has a door 360 that opens from widthwise center of the vehicle toward a widthwise end, i.e. opens from a side edge 350b located near a vehicle with center. When elongated baggage Ca, such as a golf bag or a baby buggy, is to be loaded into a trunk of such a vehicle 300, the elongated baggage Ca has to be inclined sufficiently so as not to contact the door 360; that is, a large inclination θ1 of the baggage Ca is required. However, as the baggage Ca is loaded in such an inclined state, the distal end of the baggage Ca may contact a rear seat 315 so that the baggage Ca cannot be appropriately stored into the trunk 316.

By contrast, the door 60 in the embodiment of the vehicle 10 is constructed to open from a vehicle widthwise end portion toward the vehicle widthwise center, as shown in FIG. 14(b). Because the door 60 opens toward the vehicle widthwise center, elongated baggage Ca has to be inclined only slightly, i.e. by a small inclination angle θ2, with respect to the vehicle width direction at the time of storage into the trunk. Because the elongated baggage Ca has to be inclined only slightly, the third row of seats would not interfere with the elongated baggage Ca at the time of storage into the trunk, and thus, the elongated baggage Ca can be easily stored into the trunk.

Further, in the comparative example vehicle 300, as shown in FIG. 15(a), the door 360 starts opening from near a driver-seat-side end portion of a tailgate 340. A door knob for opening the door 360 is provided near the position where the door 360 starts opening. A passenger who wants to open the door 360 first moves from a front passenger seat 313 to a rear corner portion of the vehicle 300 and then opens the door 360 while moving from the rear corner portion to a rear right end of the vehicle 300.

By contrast, the door 60 in the embodiment of the vehicle 10 is constructed to open from a position near the widthwise end portion of the tailgate 40. The knob (depicted by reference numeral 62 in FIG. 3) for opening the door 60 is provided near the position where the door 60 starts opening. A passenger who wants to open the door 60 first moves from the front passenger seat 13 to a rear corner portion of the vehicle 10. Because the rear corner portion of the vehicle and the widthwise end portion of the tailgate 40 are located near to each other, the knob for opening the door 60 is also mounted in that neighborhood. Thus, the passenger can open the door 60 without moving to the vehicle width center in a rear portion of the vehicle, and thus, a distance over which the passenger has to move along the peripheral edge of the vehicle can be significantly reduced.

Referring now to FIGS. 1 and 3 as well, the driver seat 12 is offset in one direction from the centerlines C1 and C2, and one of the side edges (54 in FIG. 4) of the entrance/exit opening 50 is disposed opposite the driver seat 12. Namely, the side edge from which the door 60 of the entrance/exit opening 50 starts opening is located adjacent to the front passenger seat 13. When baggage is to be loaded/unloaded in the neighborhood of a roadway, it is desirable that the baggage loading/unloading operation be performed at a position off the roadway. According to the present invention, where the door 60 starts opening from an end position adjacent to the front passenger seat 13, the baggage loading/unloading operation can be performed at a position off the roadway.

Embodiment 2

Figure 16:
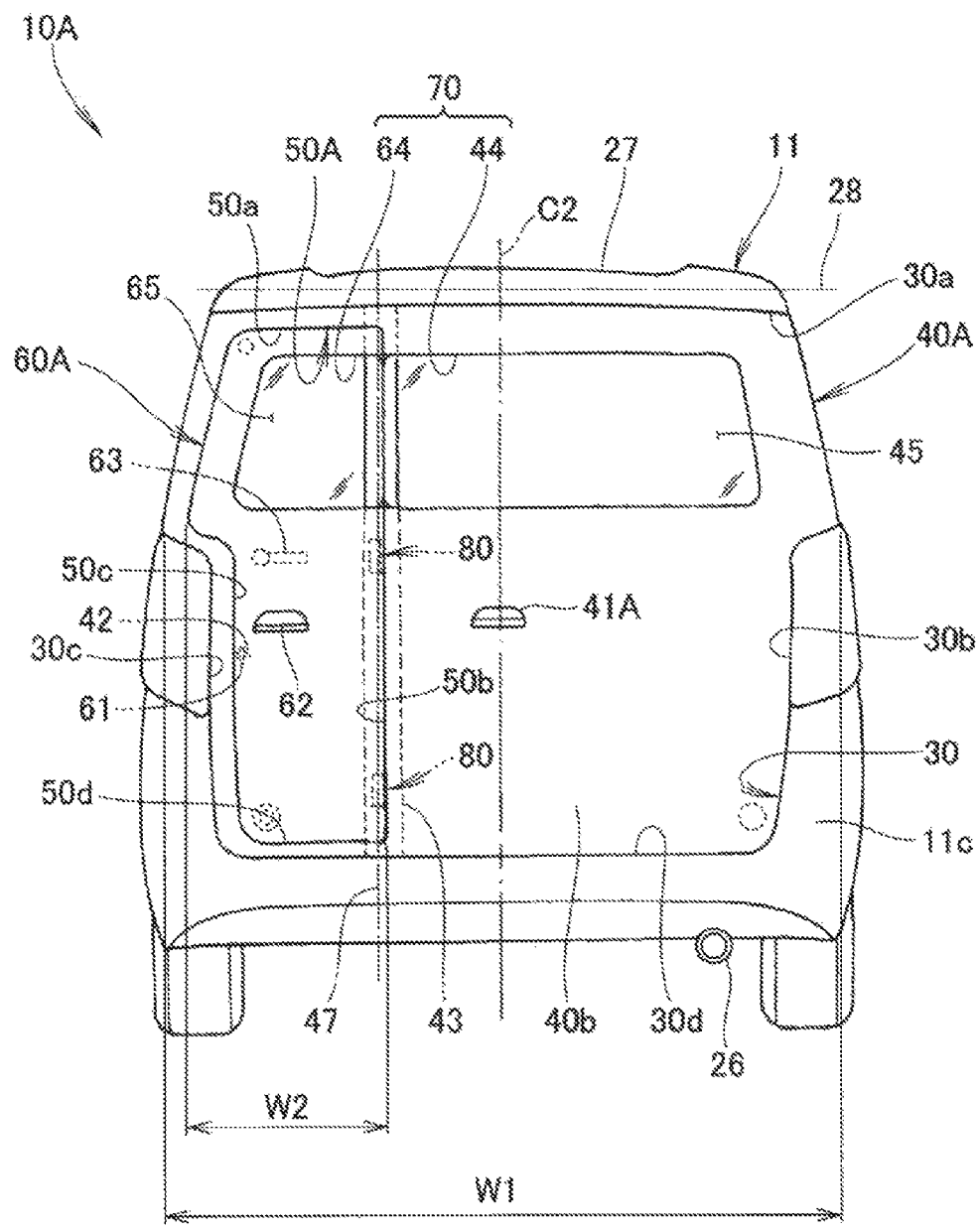
FIG. 16 is a rear view of a second embodiment of the vehicle of the present invention.

Next, a second embodiment of the vehicle 10A of the present invention will be described with reference to FIG. 16. FIG. 16 shows the second embodiment of the vehicle 10A of the present invention in a manner corresponding to FIG. 3.

In the second embodiment, a ratio of a width W2 of a door 60A to the width W1 of the tailgate 40 is W2=0.3×W1. A tailgate knob 41A (opening operation means 41) is disposed at a position avoiding the exhaust port 26 in the vehicle width direction. The second embodiment of the vehicle 10A constructed in this manner can also achieve the aforementioned advantageous benefits of the present invention.

Embodiment 8

Figure 17:
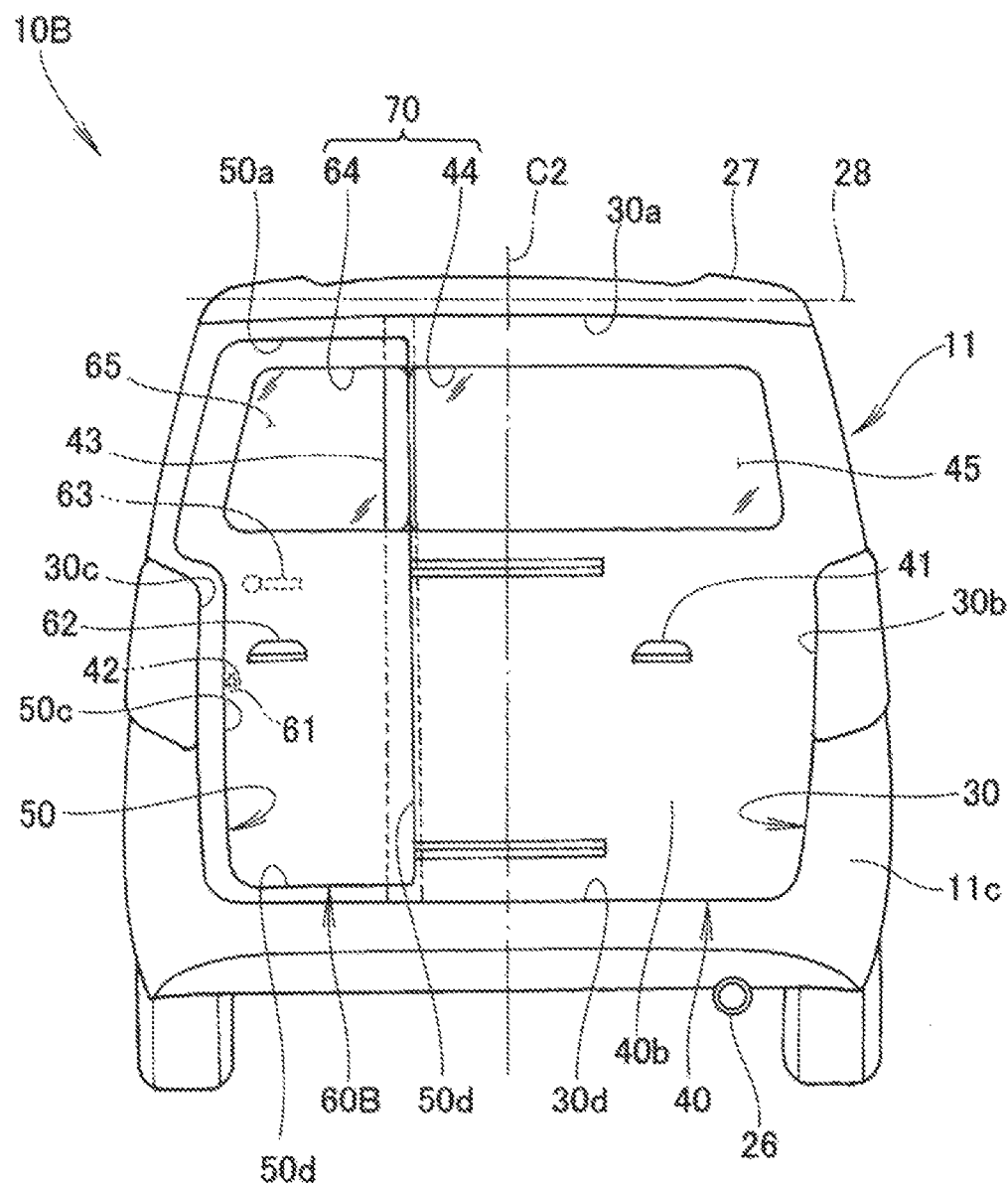
FIG. 17 is a rear view of a third embodiment of the vehicle of the present invention.

Next, a third embodiment of the vehicle 10B of the present invention will be described with reference to FIG. 17. FIG. 17 shows the third embodiment 10B of the vehicle of the present invention in a manner corresponding to FIG. 3.

In the third embodiment of the vehicle 10B, as shown in FIG. 17, a door 60B is a sliding door slidable in the vehicle width direction. The sliding door too can be said to be a type of horizontally openable door.

The third embodiment of the vehicle 10B constructed in this manner can also achieve the aforementioned advantageous benefits of the present invention. Because the door 60B is a sliding door slidable in the vehicle width direction as noted above, an amount of projection of the door 60B toward the rear of the vehicle can be even further reduced. Note that the third embodiment of the vehicle 10B does not include the hinge (depicted by reference numeral 80 in FIG. 4) and the second opening/closing shaft (depicted by reference numeral 47 in FIG. 3).

Embodiment 4

Figure 18:
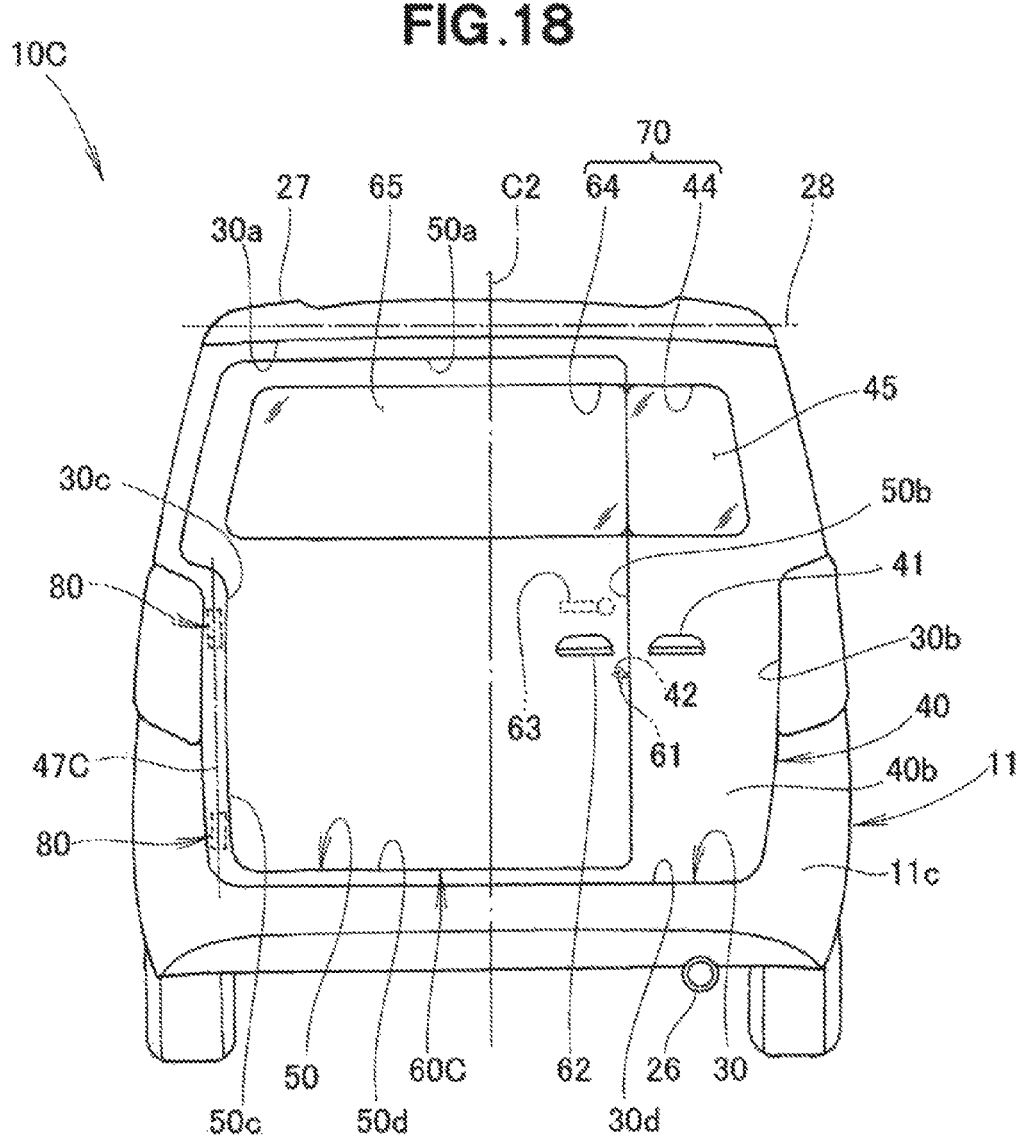
FIG. 18 is a rear view of a fourth embodiment of the vehicle of the present invention.

Next, a fourth embodiment of the vehicle 10C of the present invention will be described with reference to FIG. 18. FIG. 18 shows the fourth embodiment of the vehicle 10C of the present invention in a manner corresponding to FIG. 3.

In the fourth embodiment of the vehicle 10C, as shown in FIG. 18, a door 60C opens from a widthwise end portion. Namely, a second opening/closing shaft 47C is provided on the widthwise end portion. The fourth embodiment of the vehicle 10C constructed in this manner can also achieve the aforementioned advantageous benefits of the present invention. Note that the fourth embodiment of the vehicle 10C does not include the pillar (depicted by reference numeral 43 in FIG. 3).

Embodiment 5

Figure 19:
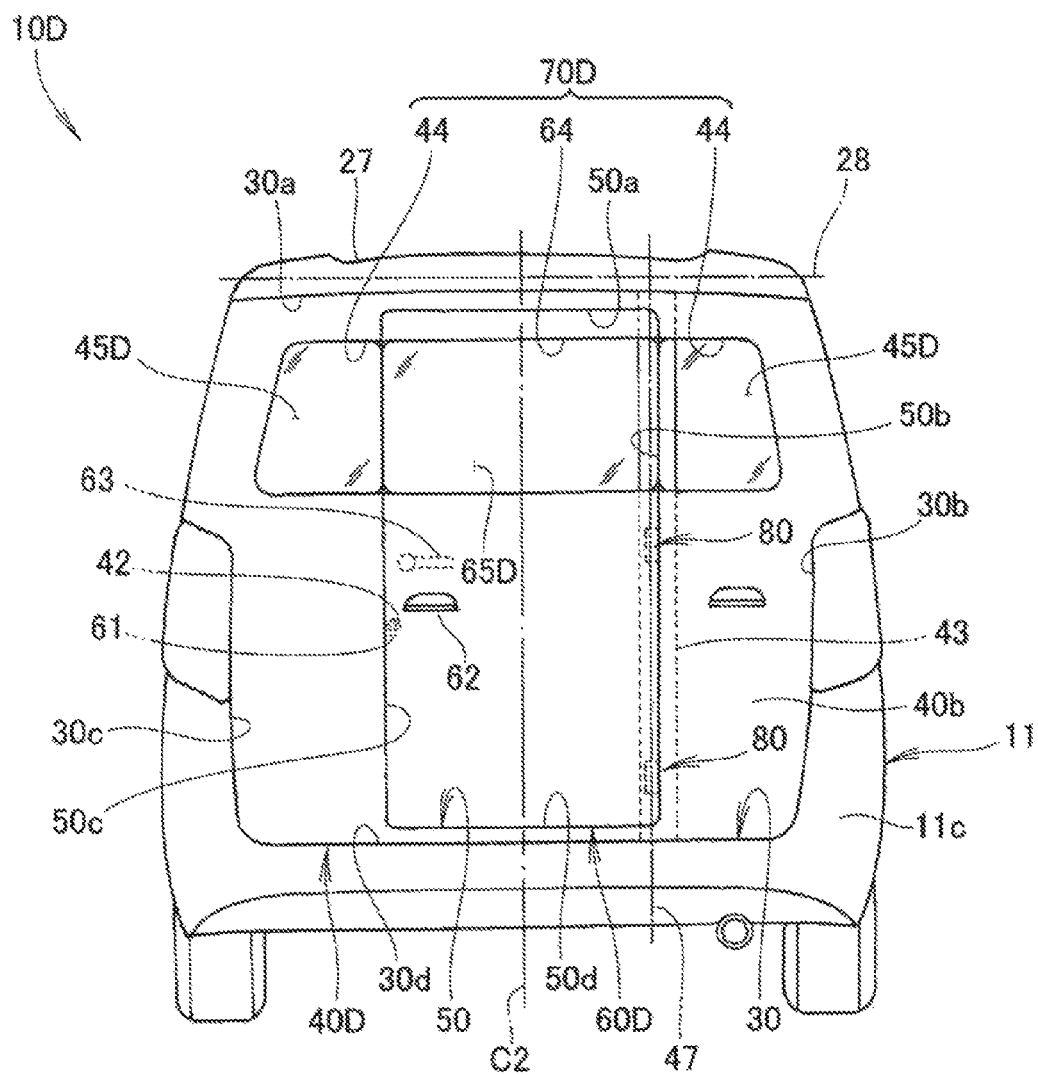
FIG. 19 is a rear view of a fifth embodiment of the vehicle of the present invention.

Next, a fifth embodiment of the vehicle 10D of the present invention will be described with reference to FIG. 19. FIG. 19 shows the fifth embodiment of the vehicle 10D of the present invention in a manner corresponding to FIG. 3.

In the fifth embodiment of the vehicle 10D, as shown in FIG. 19, a door 60D is provided centrally in a tailgate 40D. Thus, a door window glass 65D is disposed centrally in the width of the vehicle, and two tailgate window glasses 45D are disposed sandwiching the door window glass 65D. Namely, a window section 70D comprises the door window glass 65D and the two tailgate window glasses 45D. The fifth embodiment of the vehicle 10D constructed in this manner can also achieve the aforementioned advantageous benefits of the present invention.

Embodiment 6

Figure 20:
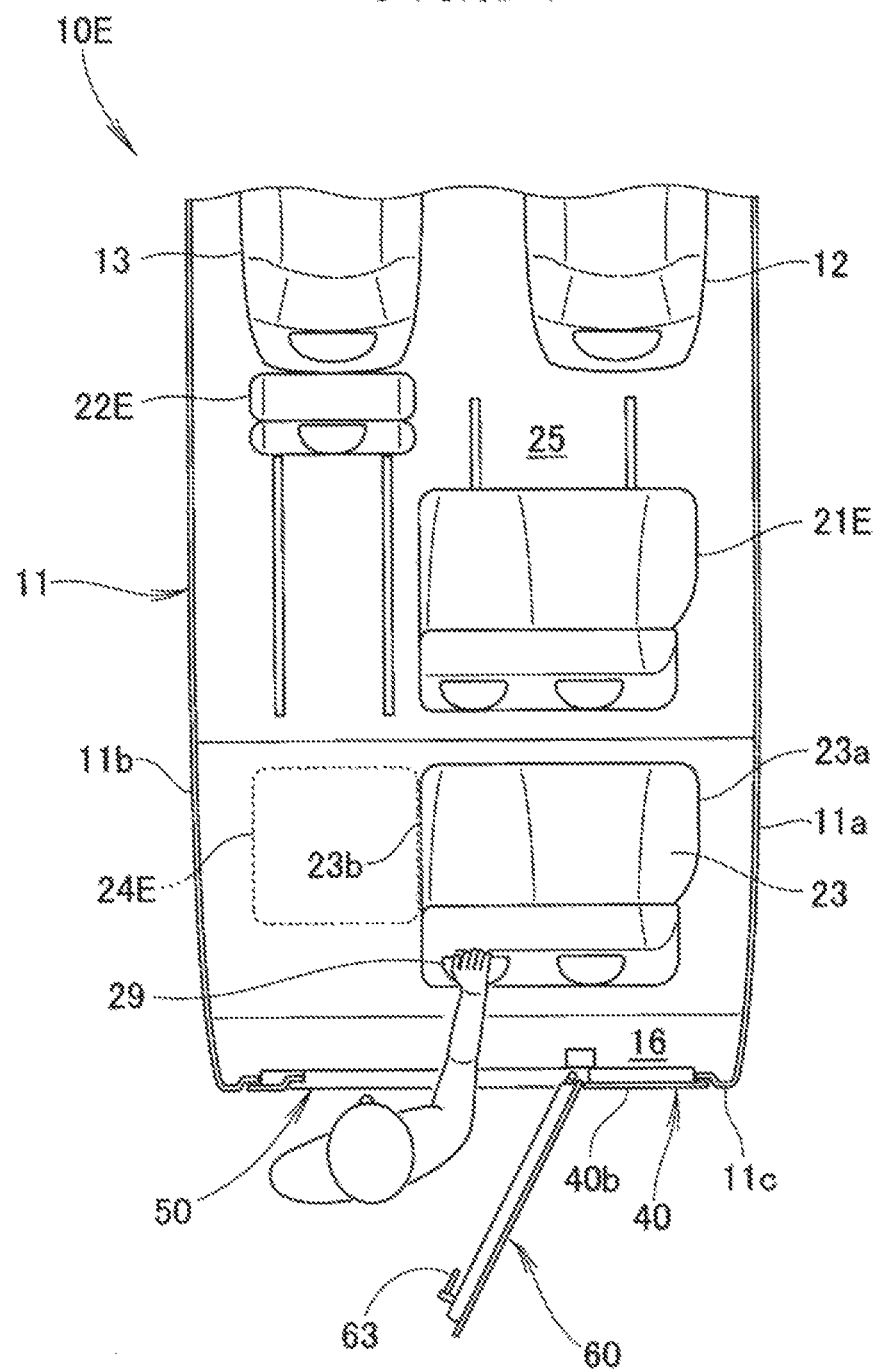
FIG. 20 is a top plan view of a sixth embodiment of the vehicle of the present invention.

Next, a sixth embodiment of the vehicle 10E of the present invention will be described with reference to FIG. 20. FIG. 20 shows the sixth embodiment of the vehicle 10E of the present invention in a manner corresponding to FIG. 9(*b*).

In the sixth embodiment of the vehicle 10E, as shown in FIG. 20, a front-side sub seat 22E is constructed to be storable beneath a floor surface of the passenger compartment. The front-side sub seat 22E is not only movable forward but also collapsible. The sixth embodiment of the vehicle 10E constructed in this manner can also achieve the aforementioned advantageous benefits of the present invention.

Note that the seat constructed to be collapsible in the vehicle width direction, the seat constructed to be collapsible in the front-rear direction and the seat constructed to be storable beneath the floor surface may be combined as desired as long as the aforementioned advantageous benefits of the present invention are achievable.

Furthermore, whereas the vehicle of the present invention has been described above in relation to the case where it is a right-hand-drive vehicle, the basic principles of the present invention are also applicable to a left-hand-drive vehicle. In such a case, the invention may be modified as appropriate; for example, the entrance/exit opening and the door may be provided on a substantial right half of the rear section of the vehicle so that the door is opened from a widthwise end portion opposite the driver seat.

In addition, whereas the various embodiments have been illustratively described above to facilitate understanding of the present invention, and the present invention should never be construed as limited to the above-described embodiments and may be modified as desired as long as the aforementioned advantageous benefits of the present invention are achievable. Furthermore, each of the above-described embodiments may be combined with any of the other embodiments as appropriate.

INDUSTRIAL APPLICABILITY

The basic principles of the present invention are well suited for application to wagon-type vehicles.

LIST OF REFERENCE SIGNS

10, 10A, 10B, 10C, 10D, 10E . . . vehicle, 11 . . . vehicle body, 26 . . . exhaust port, 30 . . . rear opening, 40, 40A . . . tailgate, 40b . . . remaining rear surface portion, 41, 41A . . . tailgate knob (opening operation means), 50, 50A . . . entrance/exit opening, 50b . . . side edge of the entrance/exit opening, 50b . . . side edge of the entrance/exit opening (opening start end), 60, 60A, 60B, 60C, 60D, 60E . . . door, 61 . . . door latch, 62 . . . outer handle, 63 . . . inner handle (canceling operation means), C2 . . . centerline extending in an up-down direction centrally across a width of the vehicle (widthwise centerline of the vehicle body), C3 . . . widthwise centerline of the entrance/ exit opening extending centrally across a width of the entrance/exit opening, C4 . . . centerline between the widthwise centerline of the vehicle body and a widthwise end of the vehicle body

The invention claimed is:

1. A vehicle comprising:
an exhaust port exposed rearward from a rear surface of the vehicle for emitting discharge produced by a travel drive system of the vehicle,
wherein the rear surface has a rear opening formed therein to extend over a substantially entire range, in a vehicle width direction, of the rear surface, a tailgate being supported on a vehicle body for openably and closably covering the rear opening,
wherein the tailgate has an entrance/exit opening formed in a portion, in the vehicle width direction, of the tailgate, and a remaining rear surface portion other than the entrance/exit opening,
wherein the entrance/exit opening has a lower edge extending in the vehicle width direction to an end portion of the rear opening opposite the remaining rear surface portion, and
wherein the exhaust port is offset from the entrance/exit opening in the vehicle width direction and located only at a position overlapping the remaining rear surface portion, the exhaust port being located beneath a lower edge of the rear opening.

2. The vehicle according to claim 1, wherein left and right side edges of the entrance/exit opening are offset in the vehicle width direction from a widthwise centerline of the vehicle body.

3. The vehicle according to claim 1,
wherein the exhaust port is located closer to a widthwise end of the vehicle body than a centerline between a widthwise centerline of the vehicle body and the widthwise end of the vehicle body, and
wherein left and right side edges of the entrance/exit opening are located closer to the widthwise centerline of the vehicle body than the centerline between the widthwise centerline of the vehicle body and the widthwise end of the vehicle body.

4. The vehicle according to claim 1, further comprising a door capable of opening and closing the entrance/exit opening,
wherein one of left and right side edges of the entrance/ exit opening that is remote from the exhaust port is an opening start end that starts to be opened by the door.

5. The vehicle according to claim 4, further comprising an outer handle for opening and closing the door, the outer handle being provided on an outer surface of the door near the side edge that is the opening start end.

6. The vehicle according to claim 1, further comprising a door capable of opening and closing the entrance/exit opening,
wherein a door latch for maintaining the door in a closed position is provided on the door, and
wherein a canceling operation means capable canceling latching by the door latch is provided on an inner surface of the door.

7. The vehicle according to claim 1, wherein an opening operation means capable of opening the tailgate is provided only on an outer surface of the tailgate.

* * * * *